(12) United States Patent
Richey et al.

(10) Patent No.: US 8,493,206 B2
(45) Date of Patent: Jul. 23, 2013

(54) AUGMENTED REALITY AND LOCATION DETERMINATION METHODS AND APPARATUS

(75) Inventors: Luke Richey, Liberty Lake, WA (US); Allen Greaves, Spokane, WA (US)

(73) Assignee: Gravity Jack, Inc., Liberty Lake, WA (US)

( * ) Notice: Subject to any disclaimer, the term of this patent is extended or adjusted under 35 U.S.C. 154(b) by 371 days.

(21) Appl. No.: 12/847,771

(22) Filed: Jul. 30, 2010

(65) Prior Publication Data

US 2012/0025975 A1    Feb. 2, 2012

(51) Int. Cl.
*G08B 1/08* (2006.01)

(52) U.S. Cl.
USPC .............. 340/539.13; 340/539.11; 345/633; 342/357.2

(58) Field of Classification Search
USPC ................................................... 340/539.13
See application file for complete search history.

(56) References Cited

U.S. PATENT DOCUMENTS

| | | | |
|---|---|---|---|
| 5,952,969 | A | 9/1999 | Hagerman et al. |
| 6,064,335 | A | 5/2000 | Eschenbach |
| 6,124,825 | A | 9/2000 | Eschenbach |
| 6,398,452 | B1 | 6/2002 | Wagner et al. |
| RE39,170 | E | 7/2006 | Wagner et al. |
| 8,094,833 | B2 | 1/2012 | Mao et al. |
| 2004/0239756 | A1 | 12/2004 | Aliaga et al. |
| 2005/0192024 | A1 | 9/2005 | Sheynblat |
| 2007/0202838 | A1* | 8/2007 | Zancola et al. ............... 455/344 |
| 2008/0211813 | A1 | 9/2008 | Jamwal et al. |
| 2008/0280624 | A1 | 11/2008 | Wrappe |
| 2008/0300854 | A1* | 12/2008 | Eibye ................................. 704/3 |
| 2009/0135002 | A1* | 5/2009 | Blinnikka et al. ....... 340/539.13 |
| 2009/0244097 | A1 | 10/2009 | Estevez |
| 2010/0109864 | A1 | 5/2010 | Haartsen |
| 2010/0277310 | A1 | 11/2010 | Imae |
| 2010/0289640 | A1 | 11/2010 | Annamalai |
| 2010/0315418 | A1 | 12/2010 | Woo |
| 2012/0025974 | A1 | 2/2012 | Richey et al. |
| 2012/0025976 | A1 | 2/2012 | Richey et al. |

FOREIGN PATENT DOCUMENTS

| | | |
|---|---|---|
| GB | 2437408 | 10/2007 |
| GB | 0904316.7 | 5/2009 |
| GB | 0904316.7 | 6/2009 |
| WO | WO 97/47820 | 12/1997 |

OTHER PUBLICATIONS

PCT/US2011/045586, Mar. 19, 2012, Search Report.

(Continued)

*Primary Examiner* — Kerri McNally
(74) *Attorney, Agent, or Firm* — Wells St. John P.S.

(57) ABSTRACT

Augmented reality and location determination methods and apparatus are disclosed according to some aspects of the description. In one aspect, a location determination method includes accessing first location information regarding a location of a user interaction device in a physical world, wherein the user interaction device is configured to generate an augmented reality representation with respect to the physical world, using the first location information, identifying a marker which is proximately located with respect to the location of the user interaction device, accessing an image generated by the user interaction device which includes the marker, and processing the image to determine second location information regarding the location of the user interaction device, and wherein the second location information has increased accuracy with respect to the location of the user interaction device in the physical world compared with the first location information.

20 Claims, 11 Drawing Sheets

OTHER PUBLICATIONS

PCT/US2011/045586, Mar. 19, 2012, Written Opinion.
"Micello Indoor Maps Service for iPhone Users"; Dec. 30, 2009; 11 pp.; www.mydigitallife.info/2009/09/27/micello-indoor-maps-service-for-iphone-users/.
"Apc Nokia working on 'indoor GPS' system"; Flynn, D.; http://apcmag.com/print.aspx?id=3038&mode+print; Dec. 30, 2009; 1 pp.
"Fast Approximate Nearest Neighbors With Automatic Algorithm Configuration"; Muja et al.; 2009; 10 pp.
"Speeded-Up Robust Features (SURF)"; Bay et al.; Sep. 10, 2008; pp. 1-14.

* cited by examiner

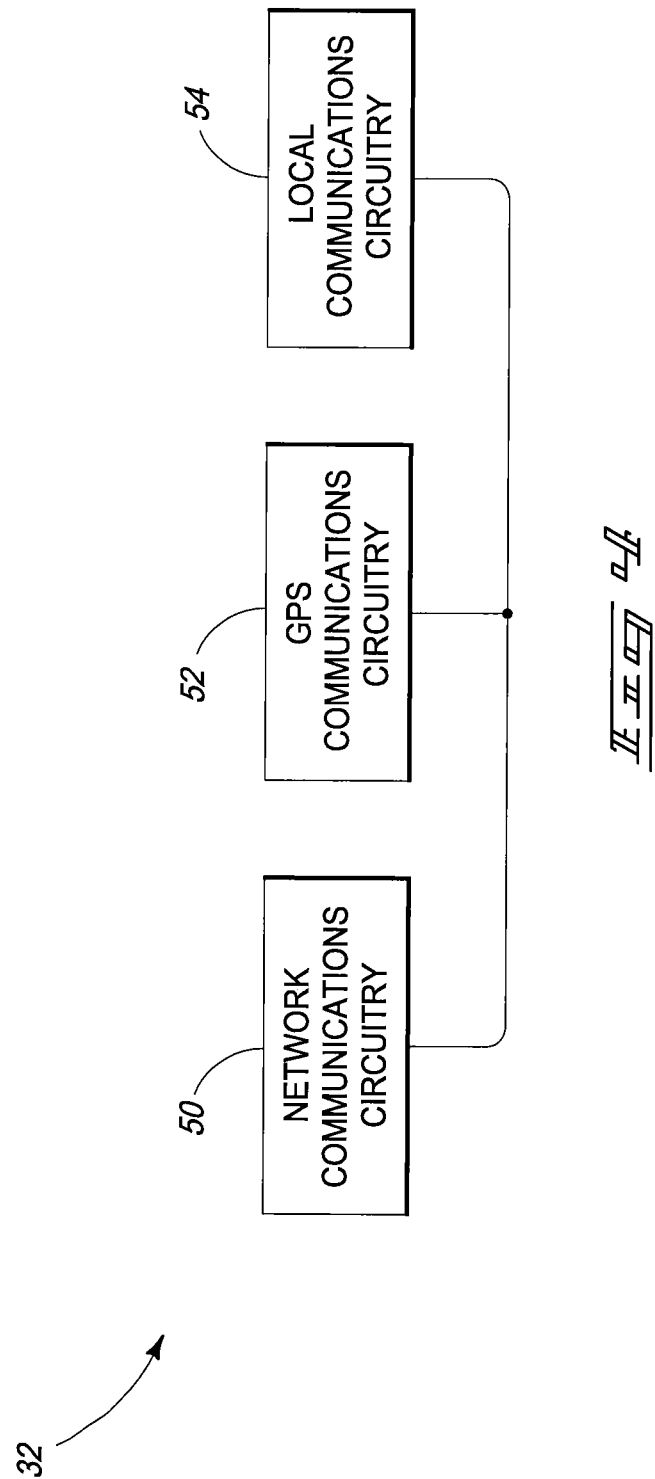

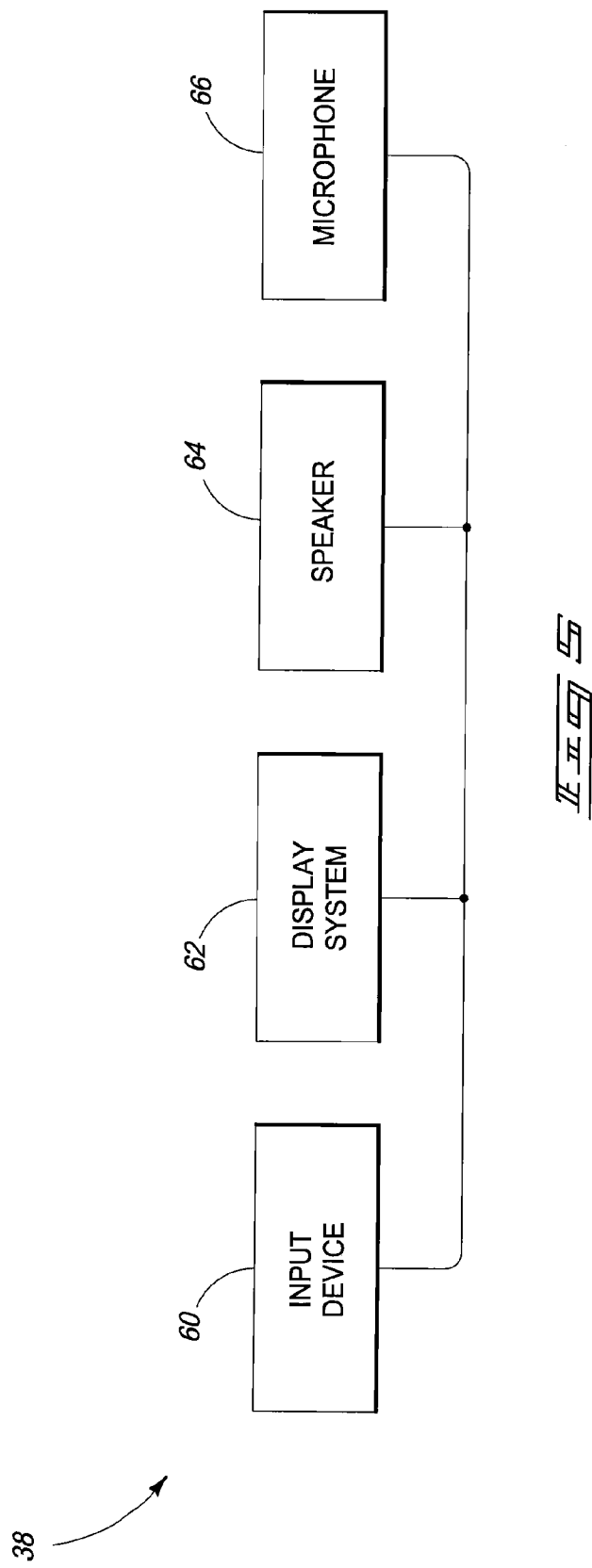

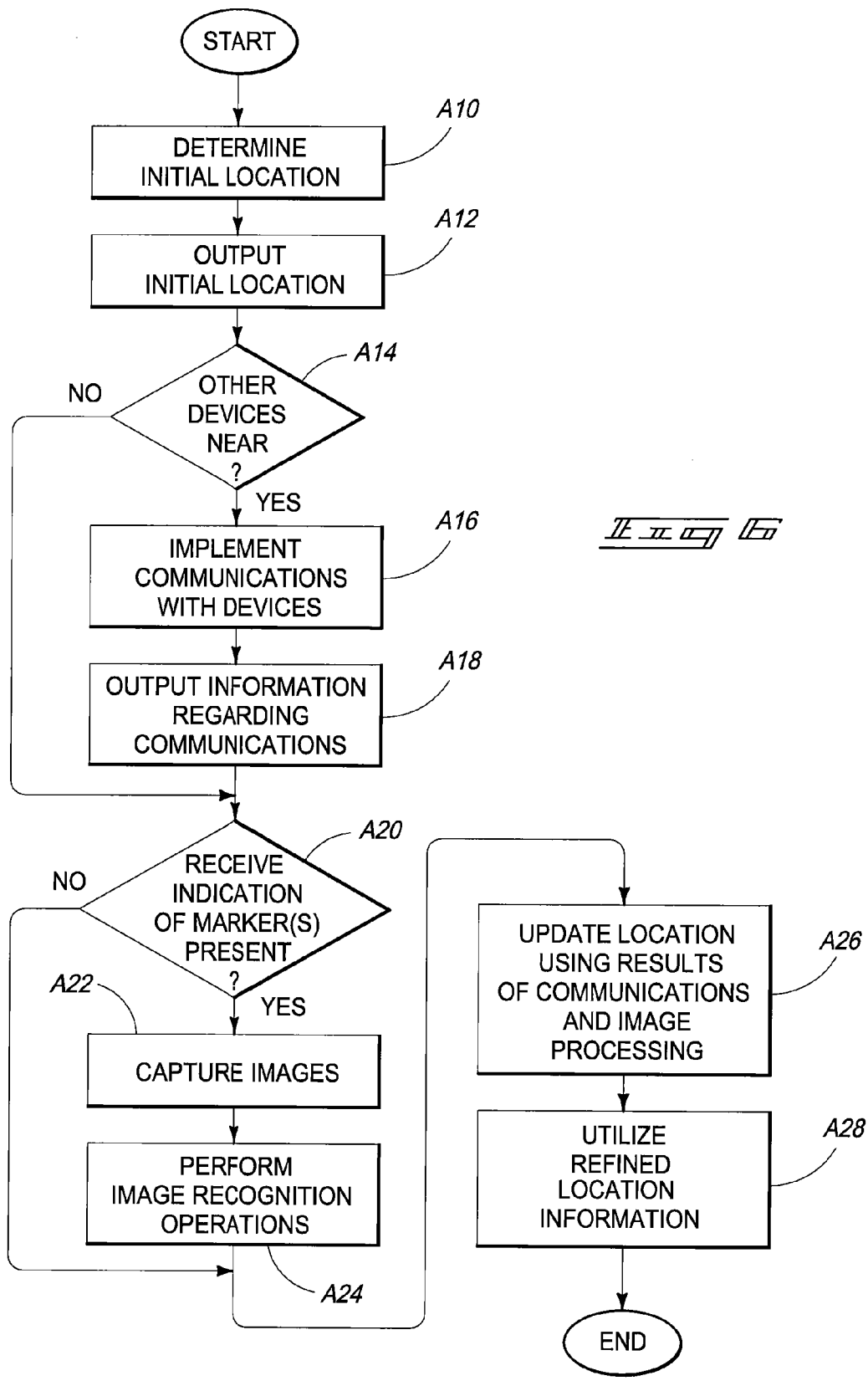

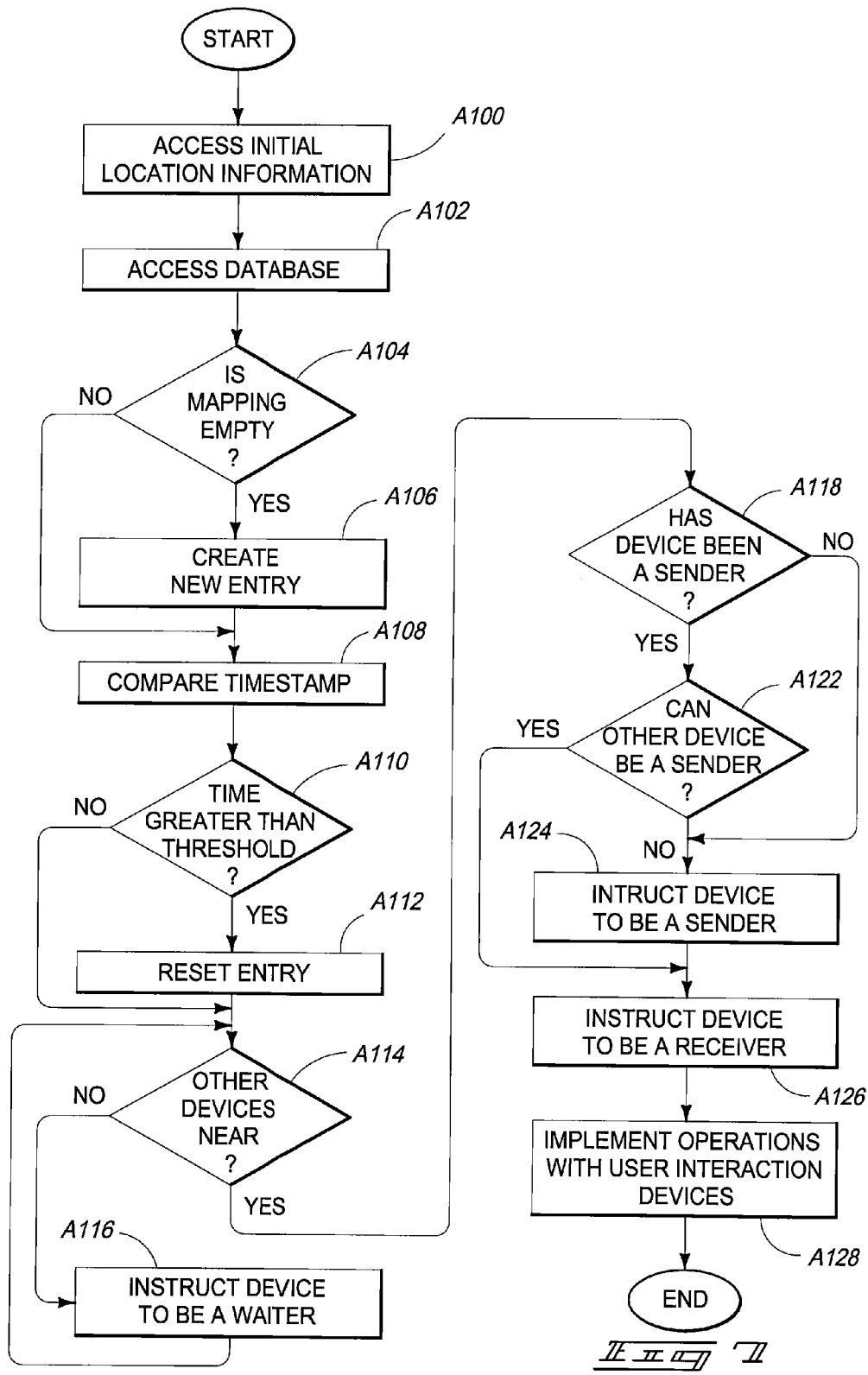

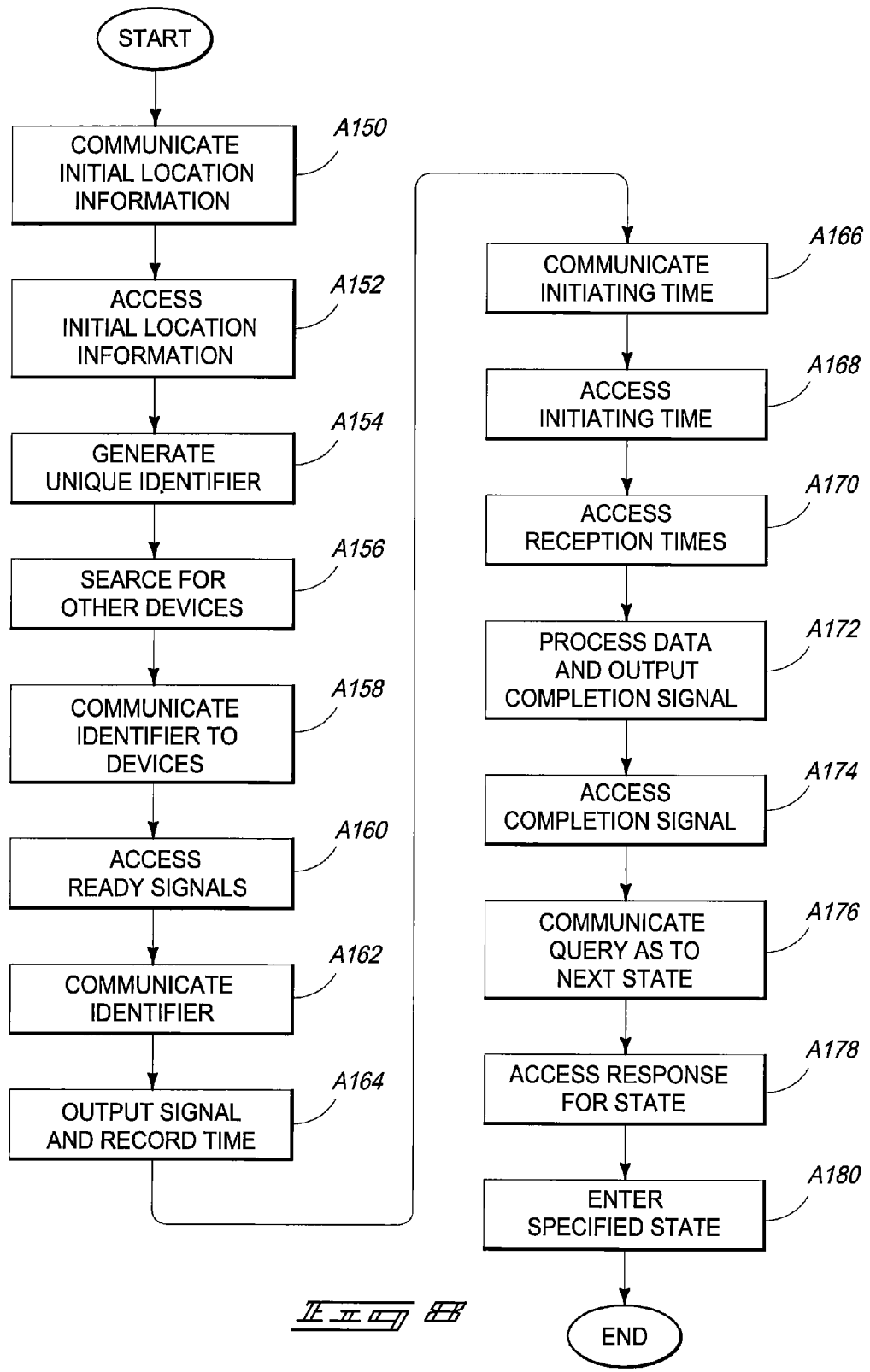

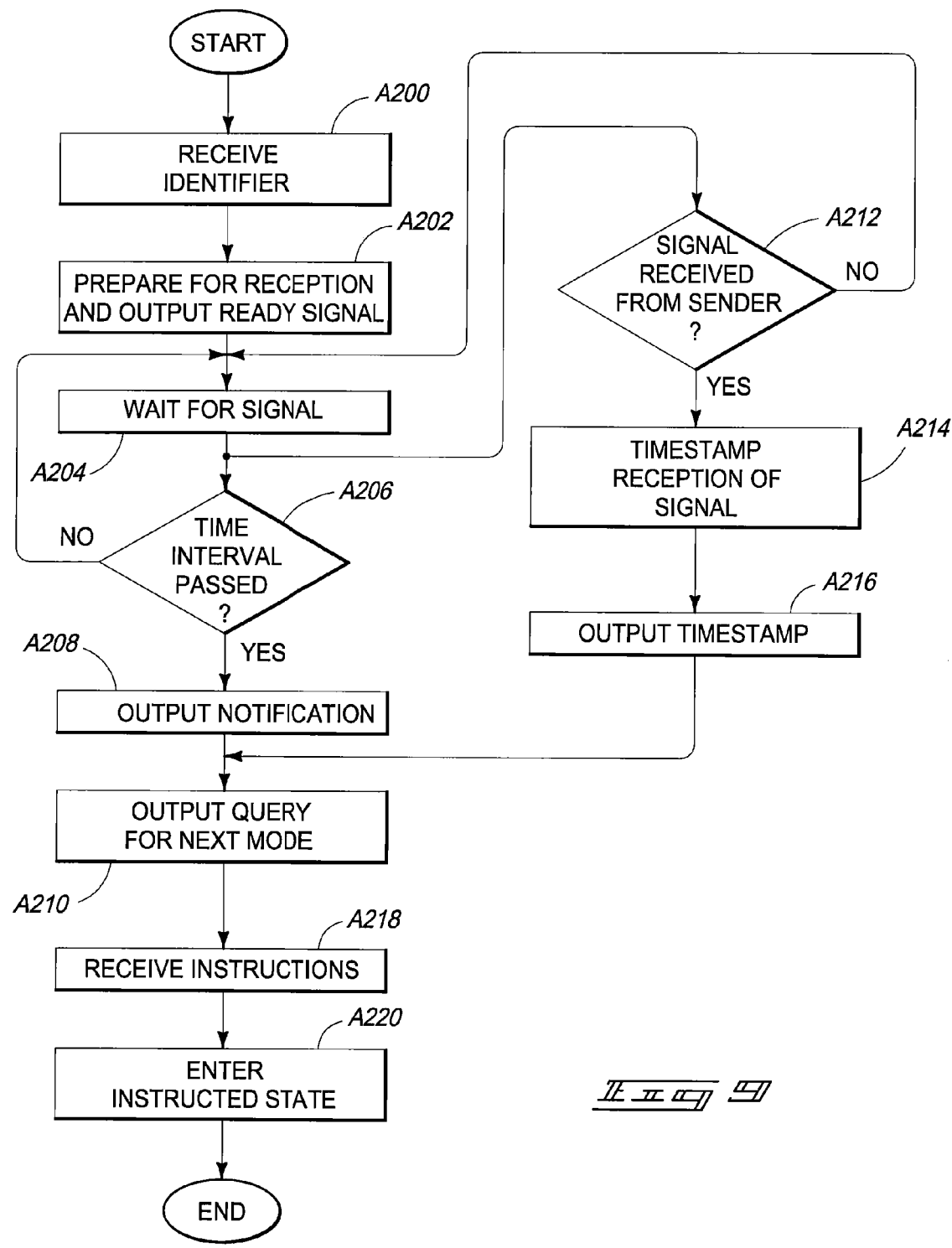

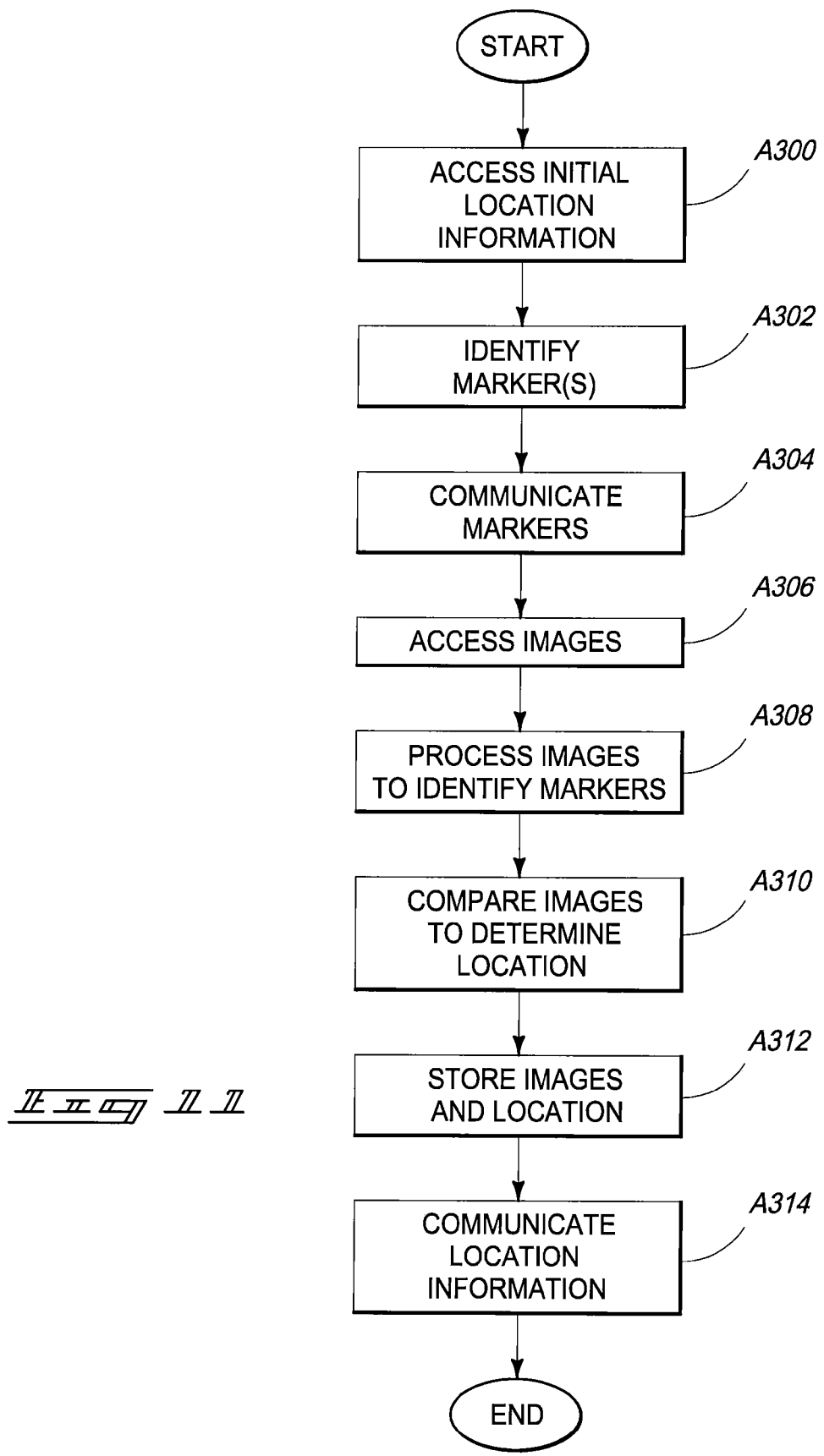

AUGMENTED REALITY AND LOCATION DETERMINATION METHODS AND APPARATUS

TECHNICAL FIELD

This disclosure relates to augmented reality and location determination methods and apparatus.

BACKGROUND

Computing systems have continually evolved and the popularity of computing systems continues to increase. The advancement of computing systems creates new uses and applications for the computing systems. For example, the processing speeds, storage capacities and network communication speeds are constantly increasing enabling the use of computing systems in increasing numbers of applications.

Furthermore, computing systems have evolved from typical office or desk systems to smaller devices, some of which have increased portability, which further expands the possible applications of the computing systems. More specifically, notebook computers have evolved from desktop computers, and more recently, handheld portable devices have also advanced significantly. Personal digital assistants, media players, cellular telephones, smartphones, and other portable devices have increased processing power and storage capacities while communications networks have also been improved allowing greater rates of data transfer between the computing systems.

Some computing systems and networks have evolved to a sufficient extent to perform augmented reality operations which augment the physical world with virtual computer-generated imagery in one example. In addition, some portable computing systems have sufficient processing, storage and communications capabilities to provide real-time augmented reality data for mobile users.

At least some aspects of the disclosure are directed to improved methods, apparatus and programming for implementing augmented reality operations.

BRIEF DESCRIPTION OF THE DRAWINGS

FIG. 4 is a functional block diagram of communications circuitry of a user interaction device according to one embodiment.

FIG. 5 is a functional block diagram of a user interface of a user interaction device according to one embodiment.

FIG. 6 is a flow chart of a method implemented by a user interaction device to implement augmented reality operations according to one embodiment.

FIG. 7 is a flow chart of a method implemented by a management device with respect to a plurality of user interaction devices according to one embodiment.

FIG. 8 is a flow chart of a method of outputting wireless communications signals according to one embodiment.

FIG. 9 is a flow chart of a method of receiving wireless communications signals according to one embodiment.

FIG. 11 is a flow chart of a method implemented by a management device with respect to image recognition operations according to one embodiment.

DETAILED DESCRIPTION

Figure 1:
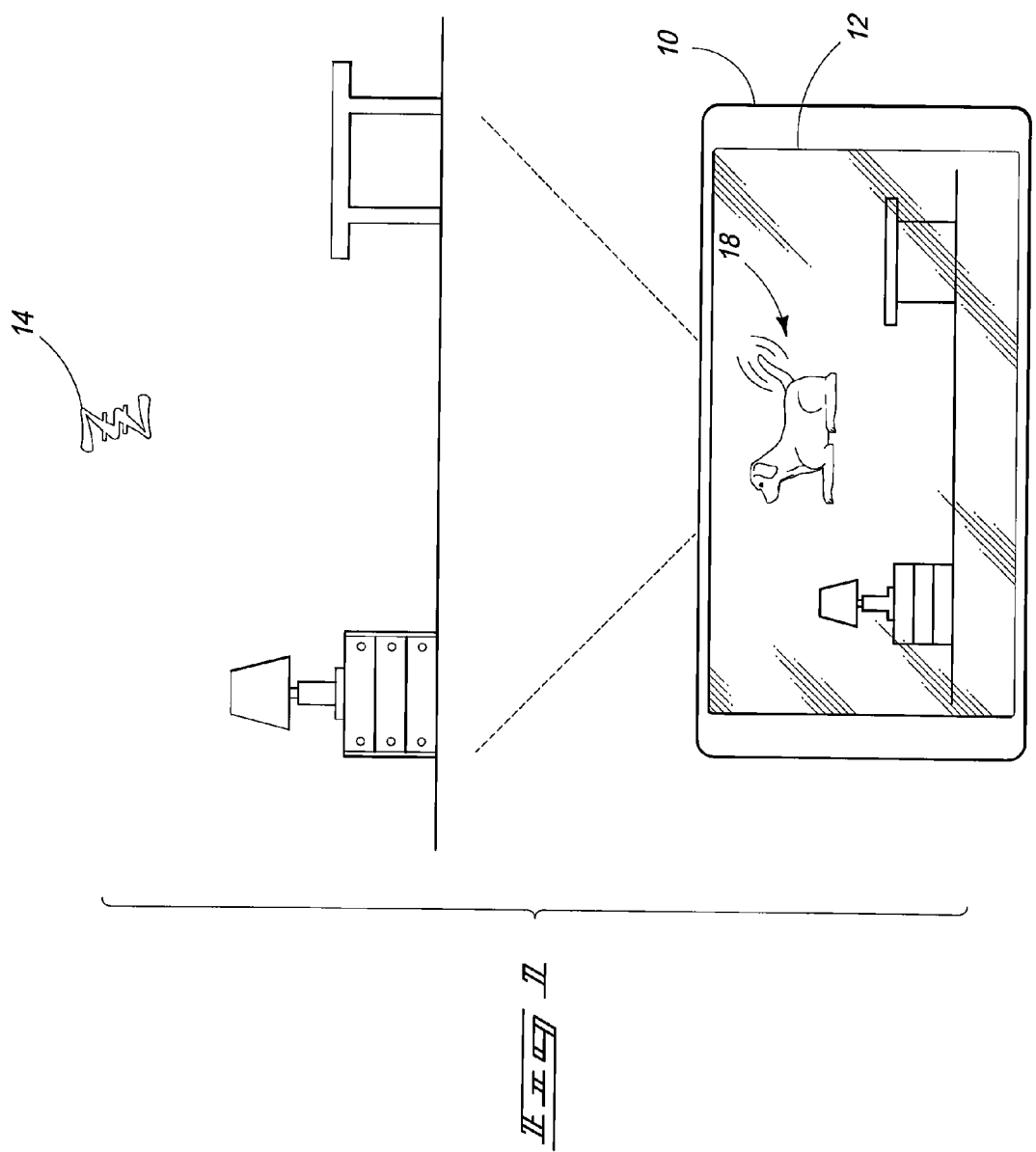
FIG. 1 is an illustrative representation of a user interaction device implementing augmented reality operations according to one embodiment.

Attention is directed to the following commonly assigned applications, which are incorporated herein by reference:

U.S. patent application Ser. No. 12/847,754 entitled "Augmented Reality and Location Determination Methods and Apparatus" by inventors Luke Richey and Allen Greaves, and U.S. patent application Ser. No. 12/847,790 entitled "Augmented Reality and Location Determination Methods and Apparatus" by inventors Luke Richey and Allen Greaves.

Some aspects of the disclosure described herein are directed towards apparatus, methods and programming for implementing augmented reality operations where the physical world is augmented with additional information, such as virtual objects. For example, images of the physical world observed through user interaction devices may be augmented or enhanced with augmented reality representations, for example in the form of visual and/or audio data which may be experienced by users. In one example embodiment, augmented reality representations may include virtual objects which augment a user's experience of the physical world. The virtual objects may be associated with physical world objects which may be static or dynamically moving. Some of the described embodiments include a media system configured to implement and co-ordinate or manage augmented reality operations of one user interaction device or a plurality of user interaction devices which may be interacting in a collaborative augmented reality session in one arrangement.

Some augmented reality systems use location information regarding locations of the user interaction devices and locations of physical objects in the physical world to accurately augment the physical world with the augmented reality representations. The location information may be used to associate virtual objects with respective objects of the physical world in one illustrative example. At least some aspects of the disclosure are directed towards increasing the accuracy of generated location information regarding the locations of user interaction devices and which location information may be used to implement augmented reality operations. At different times, a plurality of different techniques may be available to determine the location information of user interaction devices. In some embodiments, information from the different techniques may be utilized and/or combined to provide location information of the user interaction devices of increased accuracy compared with other available location information of the user interaction devices, perhaps obtained from a single source. Additional aspects are described in the following disclosure.

According to one embodiment, a location determination method includes accessing first location information regarding a location of a user interaction device in a physical world, wherein the user interaction device is configured to generate an augmented reality representation with respect to the physical world, using the first location information, identifying a plurality of wireless communication devices which are proximately located with respect to the user interaction device, initiating wireless communications between the user interaction device and the wireless communications devices, after the initiating, accessing information regarding the wireless communications of the user interaction device and the wireless communication devices, and using the information regarding the wireless communications, determining second location information regarding the location of the user interaction device, and wherein the second location information has increased accuracy with respect to the location of the user interaction device in the physical world compared with the first location information.

According to another embodiment, A location determination method comprises accessing first location information regarding a location of a user interaction device in a physical world, wherein the user interaction device is configured to generate an augmented reality representation with respect to the physical world, using the first location information, identifying a marker which is proximately located with respect to the location of the user interaction device, accessing an image generated by the user interaction device which includes the marker, and processing the image to determine second location information regarding the location of the user interaction device, and wherein the second location information has increased accuracy with respect to the location of the user interaction device in the physical world compared with the first location information.

According to yet another embodiment, an augmented reality method comprises accessing first location information regarding a location of a user interaction device in a physical world, wherein the user interaction device is configured to generate an augmented reality representation with respect to the physical world, using the first location information, generating second location information which has increased accuracy regarding the location of the user interaction device in the physical world, and communicating augmented data to the user interaction device, and wherein the augmented data comprises the augmented reality representation.

According to another embodiment, a location determination method comprises using a user interaction device, emitting a wireless communications signal at a first moment in time, using a plurality of wireless communication devices, receiving the wireless communications signal emitted by the user interaction device at a plurality of second moments in time, and using the first and second moments in time, determining information regarding a location of the user interaction device.

According to another embodiment, a computing system comprises communications circuitry configured to implement communications externally of the computing system, and processing circuitry coupled with the communications circuitry, and wherein the processing circuitry is configured to access first location information regarding a location of a user interaction device in a physical world, to use the first location information to identify a plurality of wireless communications devices which are proximately located with respect to the location of the user interaction device, to control the communications circuitry to output a control signal which is configured to initiate wireless communications between the user interaction device and the wireless communications devices, to access information regarding the wireless communications between the user interaction device and the wireless communications devices, and to use the information regarding the wireless communications to determine second location information regarding the location of the user interaction device and which has increased accuracy with respect to the location of the user interaction device in the physical world compared with the first location information.

According to another embodiment, a computing system comprises communications circuitry configured to implement communications externally of the computing system and processing circuitry coupled with the communications circuitry, and wherein the processing circuitry is configured to access first location information received by the communications circuitry regarding a location of a user interaction device in a physical world, to identify a marker which is proximately located with respect to the location of the user interaction device, to access a plurality of images generated by the user interaction device, and to process the images with respect to the marker to determine second location information regarding the location of the user interaction device and which has increased accuracy with respect to the location of the user interaction device in the physical world compared with the first location information According to another embodiment, a computing system comprises communications circuitry configured to implement communications externally of the computing system and processing circuitry coupled with the communications circuitry, and wherein the processing circuitry is configured to access first location information received by the communications circuitry regarding a location of a user interaction device in a physical world, to generate second location information which has increased accuracy regarding the location of the user interaction device in the physical world, and to control the communications circuitry to communicate augmented data comprising an augmented reality representation to the user interaction device.

According to another embodiment, an augmented reality user interaction device comprises a camera, a display system, communications circuitry configured to implement wireless communications externally of the user interaction device, and processing circuitry coupled with the camera, the display system, and the communications circuitry, wherein the processing circuitry is configured to control the display system to generate a plurality of images which comprise image data generated by the camera and augmented data which augments the image data with an augmented reality representation, wherein the processing circuitry is further configured to control the communications circuitry to communicate first location information regarding a location of the user interaction device in a physical world externally of the user interaction device, and wherein the processing circuitry is further configured to access second location information regarding the location of the user interaction device after the outputting of the first location information and to use the second location information to generate the plurality of images, and wherein the second location information has increased accuracy regarding the location of the user interaction device in the physical world compared with the first location information.

Referring to FIG. 1, one example of augmented reality aspects of the disclosure is described. FIG. 1 illustrates a user interaction device 10 which is used to generate an image of the physical world and which is augmented by an augmented reality representation. More specifically, in the example of FIG. 1, the user interaction device 10 includes a camera (not shown) which is configured to capture images of the physical world and which may depicted using a display 12. As a user moves the user interaction device 10, a plurality of images are captured of different scenes viewed by the camera of the device 10.

In the illustrated example, the scene viewed by the device 10 includes a marker 14 on a wall of the physical world. The generated image depicted using the display 12 includes an augmented reality representation 18 which augments a user's experience of the physical world by replacing the physical world marker 14 with the representation 18. In the illustrated example, the augmented reality representation 18 is a virtual 3D object in the form of a puppy, which may be selected by another user to be associated with the marker 14.

The use of marker 14 is one example of augmented reality operations which may be implemented using the user interaction device 10 and other augmented reality operations may be implemented in other embodiments. For example, virtual objects may be associated with other physical objects of the physical world, such as other user interaction devices 10 (not shown), in images generated by device 10. In some embodiments, augmented reality representations 18 may entirely replace physical objects of the physical world.

In one more specific example, the augmented reality representations 18 may include advertising objects (e.g., banner with a product name) and the representations 18 may be associated with famous physical structures of the physical world when observed through a user interaction device 10. For example, a user at a significant football game may view a virtual object banner draped between the physical world goalposts when a user of a device 10 captures images of the end zone during a football game. Companies may pay advertising fees to have augmented reality representations of advertisements of their products associated with physical world objects and which may be viewed by users using their user interaction devices 10 who are proximately located to the physical world objects in one embodiment.

Location information regarding the locations of the user interaction device 10 and other physical objects in the physical world may be used to generate augmented reality representations 18 in captured images. In one example, the location information may be used to depict the augmented reality representations 18 accurately associated with content (e.g., objects) of the physical world (e.g., other user interaction devices, buildings, structures, mountains, etc.).

For a static physical object which does not move (e.g., marker 14), location information may be included with the augmented data which determines where the augmented reality representations 18 are to be displayed with respect to content of the physical world when the static physical object is within the field of view of the camera. For portable physical objects (e.g., user interaction devices), the augmented data may be associated with an identifier of the portable physical object. Identification information of the portable physical object and location information of the portable physical object may be used to determine when the portable physical object is present within the field of view of the camera and where augmented reality representations 18 associated with the portable physical object should be shown in generated images. Location information regarding the user interaction devices 10 and/or physical objects may be used to accurately show the augmented reality representations 18 associated with the user interaction devices 10 and/or physical world objects in images generated by the user interaction devices 10 in one embodiment.

In some embodiments, one user interaction device 10 may be present and the user may be experiencing augmented reality representations with respect to physical objects of the physical world. In other examples (e.g., FIG. 1), a plurality of users having user interaction devices 10 may be present and proximately located to one another and experiencing augmented reality representations with respect to one another in a collaborative session and/or physical world objects. The augmented reality representations may be associated with user interaction devices 10 of users and/or with physical objects. Users and user interaction devices 10 may be free to enter and leave interactive augmented reality collaborative sessions in some embodiments.

It is desired to provide accurate information regarding the locations of user interaction devices 10 to correctly associate augmented reality representations with respect to physical world objects. As described further below, methods and apparatus are described which enable location information of the user interaction devices 10 to be determined with increased accuracy compared with, for example, arrangements which use conventional location determination methods, such as a global positioning system (GPS). In some embodiments disclosed below, the user interaction devices 10 may be configured to communicate (e.g., wirelessly) with one another as well as with external devices (e.g., a management device, Wi-Fi communications devices) to implement augmented reality operations including operations with respect to determining location information of the user interaction devices 10 of increased accuracy.

Figure 2:
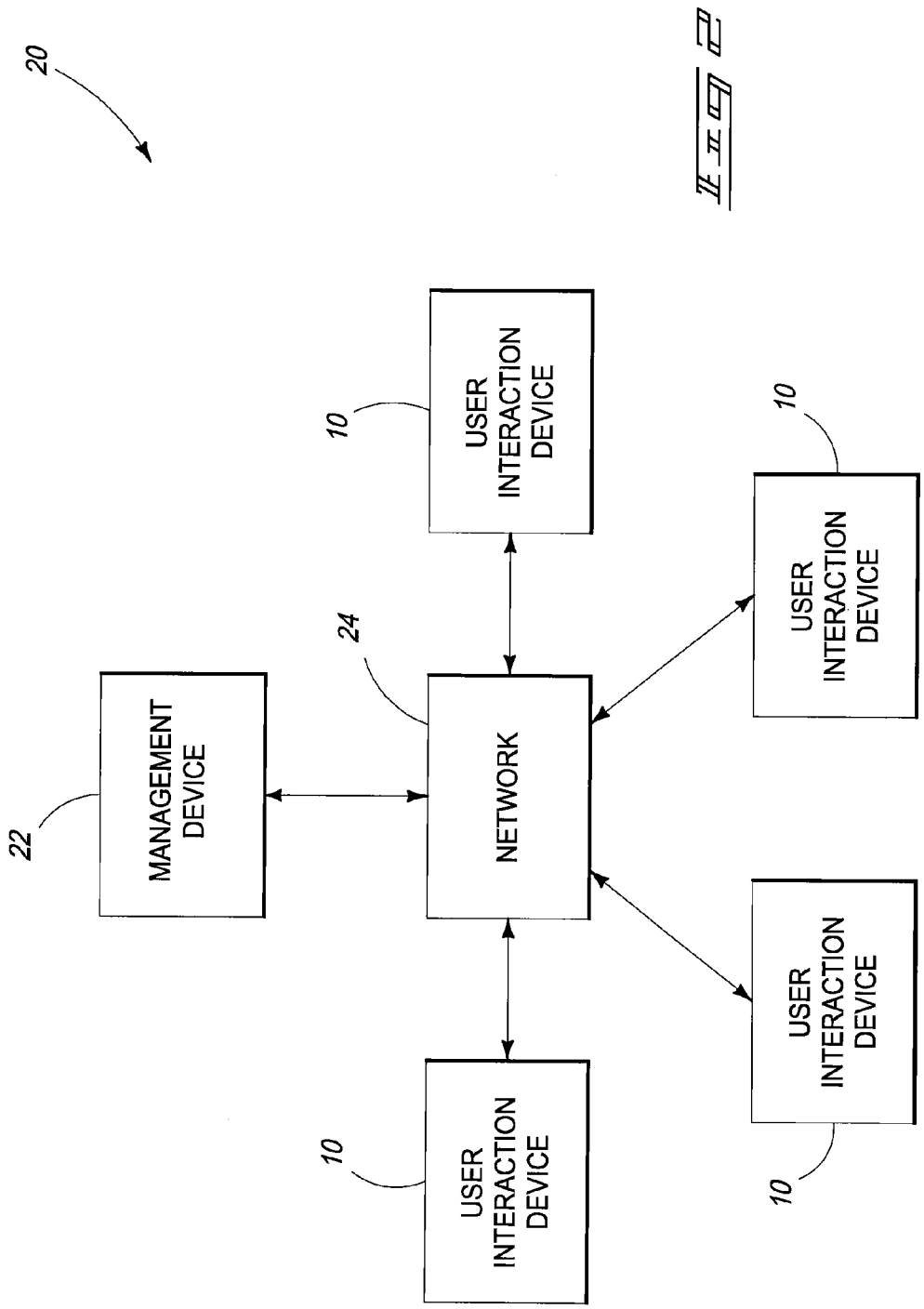
FIG. 2 is a functional block diagram of a media system according to one embodiment.

Referring to FIG. 2, one example of a media system 20 is shown. Media system 20 is configured to implement operations with respect augmenting the physical world with augmented reality representations. For example, media system 20 is configured to assist user interaction devices 10 with the generation of augmented reality representations. In a more specific example, media system 20 is configured to perform operations with respect to determining locations of user interaction devices 10 (which may be portable) for use in accurately associating augmented reality representations with the physical world. In one embodiment, media system 20 may communicate augmented data with respect to the user interaction devices 10 which may be used by the devices 10 to generate augmented reality representations.

In the illustrated example configuration of FIG. 2, media system 20 includes a plurality of use interaction devices 10 and a management device 22. User interaction devices 10 may be configured to communicate with one another as well as with management device 22. For example, the user interaction devices 10 may communicate with management device 22 via a network 24. Network 24 may be considered to be a part of media system 20 or may be external of media system 20 in different embodiments. In some embodiments, the user interaction devices 10 may also implement wireless communications with respect to other wireless communications devices (e.g., Wi-Fi communications devices) which may be within the communications ranges of the devices 10 (the Wi-Fi communications devices are not shown in FIG. 2).

The user interaction devices 10 may be proximately located with respect to one another in a group (e.g., within communications ranges of the devices 10 to implement communications with respect to one another) or in different geographical locations and not proximately located to one another. For example, different groups of user interaction devices 10 may exist in different geographical locations. User interaction devices 10 which are proximately located to one another may participate in a collaborative augmented reality session where augmented reality representations may be associated with the devices 10 in one embodiment. Additionally, only one user interaction devices 10 may be present in a given geographical location and may be implementing augmented reality operations with respect to static physical world objects.

User interaction devices 10 may be computing systems (e.g., one example is described with respect to FIG. 3) in one embodiment. The user interaction devices 10 may have substantially the same configurations or have different configurations in example embodiments. In some examples, user interaction devices 10 may be configured as portable media devices, personal digital assistants, cellular telephones, smartphones, personal computers, notebook computers, glasses worn by a user including a camera and display system capable of generating images, or any other device capable of capturing images of the physical world and generating images and/or other media content for consumption by a user which include visual images of the physical world which are augmented by one or more augmented reality representations (e.g., additional virtual image content and/or audible content which augments physical world content).

In one embodiment, management device 22 may be a server which is configured as a computing system, for example as described below with respect to FIG. 3. Management device 22 is configured to implement communications with respect to user interaction devices 10 in the described embodiment. Management device 22 may be configured to perform a plurality of operations with respect to the generation of augmented reality representations by the user interaction devices. Example operations performed include operations with respect to co-ordination and management of user interaction devices 10, co-ordination and management of communications between user interaction devices 10 and a plurality of other wireless communications devices, determining locations of user interaction devices 10 (which may be portable), and storing and communicating augmented data for use by the user interaction devices 10 to generate augmented reality representations.

In one example embodiment, the user interaction devices 10 may communicate augmented data of their respective augmented reality representations (e.g., the above-described puppy) to the management device 22, perhaps for storage, and the management device 22 may thereafter provide the augmented data to others of the user interaction devices 10 for use in generating the augmented reality representations with respect to the devices 10 which provided the augmented data. For example, in FIG. 1, the management device 22 may communicate augmented data which includes the puppy representation to user interaction device 10 which uses the augmented data to generate the augmented reality representation 18.

In one embodiment, identification data may be used to associate augmented data with respective appropriate objects of the physical world, such as user interaction devices 10 or other physical world objects. With respect to user interaction devices as described further below in one embodiment with respect to FIG. 1, initial location information regarding the location of a user interaction device 10 may be used to search a database of the management device 22 to identify other wireless communications devices (e.g., user interaction devices, Wi-Fi communications devices) within a communications range of the user interaction device 10. The database may include location information regarding the devices 10 which the initial location information is searched against, and identification information which uniquely identifies each of the wireless communications devices.

The database may also include identification information which identifies the augmented data associated with the user interaction devices 10. In one example, once the management device 22 determines that another user interaction device is proximately located to another user interaction device 10, the management device 22 may communicate the augmented data associated with one of the devices to the other device and which includes an identifier of the device to which the augmented reality representation of the augmented data is to be associated with. The receiving user interaction device may access location information regarding its present location and the location of the other device (e.g., access the location information from management device 22) and use the location information of the devices, the identification information of the other device, and the respective augmented data of the other device to generate the augmented reality representation 18 associated with the other device 10 in images captured by the device which include the other device.

In one embodiment, the device 10 may also depict other augmented reality representations associated with other proximately located user interaction devices 10 and perhaps other objects of the physical world which may be present and have associated augmented data. More specifically, some objects of the physical world are static and do not change locations (e.g., marker 14 of FIG. 1). In one embodiment, management system 22 may store augmented data to be used to generate augmented reality representations with respect to static physical objects and the management system 22 may use location information regarding the device 10 to search the database to identify augmented data for static physical objects which are proximately located to the location of the device 10. The management device 22 may communicate augmented data for a static physical object which is proximately located to the device 10 to the device 10 as well as location information where the static physical object exists in the physical world. Thereafter, the device 10 may use the location information to determine when the static physical object is within the field of view of the camera of device 10 and the device 10 may augment captured images of the static physical object with augmented reality representations using the appropriate augmented data.

Additional operations of the user interaction devices 10 with respect to generation of augmented reality representations may be managed by management device 22 in one embodiment. In one example management embodiment, user interaction devices 10 which attempt to access and utilize media system 20 to experience or implement operations with respect to augmented reality may be managed by management device 22. In one embodiment, management device 22 may manage an augmented reality session where a plurality of user interaction devices 10 are present and performing augmented reality operations with respect to one another.

In one example, media system 20 may be a closed system and user interaction devices 10 may first be registered and/or otherwise authorized prior to having permission to gain access to media system 20. In one embodiment, management device 22 may assign passwords to the devices 10 and use the passwords and identification information of the devices 10 to verify that the user interaction devices 10 are authorized to gain access to the media system 20. In some arrangements, users may initially sign-up to gain access to the media system 20, and after receiving a password, may subsequently participate in augmented reality sessions or otherwise access the media system 20 to implement augmented reality operations. Users may pay fees to participate in services provided by media system 20, for example, including services of accessing management device 22 and implementing augmented reality operations with respect to other user interaction devices 10 managed by management device 22. Access to or participation in augmented reality operations provided by media system 20 and management device 22 may be denied to users who cannot provide appropriate identification and password information in one embodiment.

As described in detail below in some embodiments, management device 22 may perform operations with respect to determination of location information of the user interaction devices 10 which may be used to implement augmented reality operations with respect to the user interaction devices 10. Some of the described location determination embodiments include implementing wireless communications between the user interaction devices 10 and/or other wireless communications devices which may be present to determine the location information. Management device 22 may be configured to manage and/or coordinate at least some of the communications of the user interaction devices 10 in one example. In addition, management device 22 may be configured to implement operations with respect to image processing to determine the location information in additional embodiments described below. Other operations may be performed by management device 22 with respect to augmented reality and some of the operations performed by the management device 22 may be performed by other devices (e.g., the user interaction devices themselves) in other embodiments.

Network 24 which may be implemented as any suitable network configuration for implementing wired and/or wireless communications between user interaction devices 10, management device 22 or other wireless communications devices. For example, network 24 may include a wireless network, local or wide area networks, Internet, cellular network, and/or other suitable infrastructure for implementing communications of digital information. In one embodiment, user interaction devices 10 may have cellular communications capabilities to communicate with network 24 and management device 22. Network 24 may implement packet-switched communications between user interaction devices 10 and management device 22 in one embodiment. As mentioned above, user interaction devices 10 may also communicate directly with one another or other wireless communications devices without use of network 24 in one embodiment.

Figure 3:
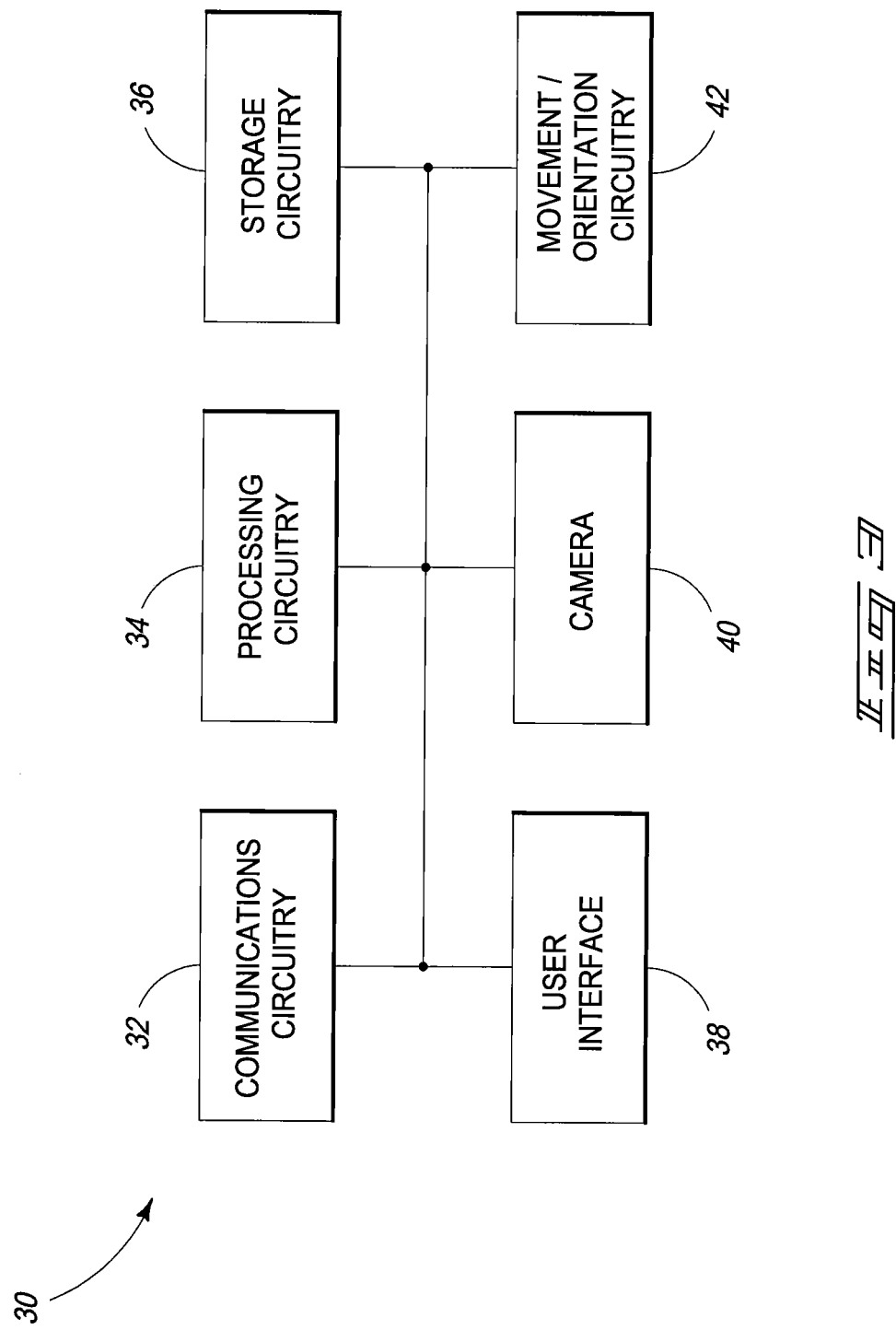
FIG. 3 is a functional block diagram of a computing system according to one embodiment.

Referring to FIG. 3, one example embodiment of a computing system 30 is shown. The illustrated system 30 includes communications circuitry 32, processing circuitry 34, storage circuitry 36, a user interface 38, and a camera 40. Other embodiments of computing system 30 are possible including more, less and/or alternative components. For example, the illustrated configuration of computing system 30 may correspond to one of user interaction devices 10 while some of the illustrated components (e.g., camera 40) may be omitted in one arrangement of computing system 30 which is implemented as management device 22.

Communications circuitry 32 is arranged to implement communications of computing system 30 with respect to external devices or systems (e.g., network 24 and other computing systems 30 implemented as other user interaction devices 10, Wi-Fi communications devices, or management device 22). Communications circuitry 32 may be configured to implement wired and/or wireless communications. Additional details of one example of communications circuitry 32 which may be utilized is discussed below with respect to FIG. 4.

In one embodiment, processing circuitry 34 is arranged to process data, control data access and storage, issue control signals or commands, and control other augmented reality operations. Processing circuitry 34 may comprise circuitry configured to implement desired programming provided by appropriate computer-readable storage media in at least one embodiment. For example, the processing circuitry 34 may be implemented as one or more processor(s) and/or other structure configured to execute executable instructions including, for example, software and/or firmware instructions. Other exemplary embodiments of processing circuitry 34 include hardware logic, PGA, FPGA, ASIC, state machines, and/or other structures alone or in combination with one or more processor(s). These examples of processing circuitry 34 are for illustration and other configurations are possible.

Storage circuitry 36 is configured to store programming such as executable code or instructions (e.g., software and/or firmware), electronic data, databases, image data, augmented data, identifiers, location information and/or other digital information and the storage circuitry 46 may include computer-readable storage media. At least some embodiments or aspects described herein may be implemented using programming stored within one or more computer-readable storage medium of storage circuitry 36 and configured to control appropriate processing circuitry 34.

The computer-readable storage medium may be embodied in one or more articles of manufacture which can contain, store, or maintain programming, data and/or digital information for use by or in connection with an instruction execution system including processing circuitry 34 in the exemplary embodiment. For example, exemplary computer-readable storage media may include any one of physical media such as electronic, magnetic, optical, electromagnetic, infrared or semiconductor media. Some more specific examples of computer-readable storage media include, but are not limited to, a portable magnetic computer diskette, such as a floppy diskette, a zip disk, a hard drive, random access memory, read only memory, flash memory, cache memory, and/or other configurations capable of storing programming, data, or other digital information.

User interface 38 is configured to interact with a user including conveying data to a user (e.g., displaying visual images for observation by the user) as well as receiving inputs from the user, for example, via a graphical user interface (GUI). User interface 38 may be configured differently in different embodiments. One example embodiment of user interface 38 is discussed below with respect to FIG. 5.

Camera 40 is configured to capture images within its field of view and generate image data of scenes of the physical world viewed by the computing system 30 in one embodiment. An example camera 40 includes an appropriate imaging sensor configured to generate digital image data responsive to received light in one implementation.

Movement/orientation circuitry 42 is configured to provide information regarding movement and orientation of the computing system 30 in the described embodiment. For example, circuitry 42 may include an accelerometer arranged to provide information regarding forces which the computing system is subjected to. Circuitry 42 may also include a compass and inclinometer configured to provide information regarding an orientation of the computing system 30 in the physical world.

Referring to FIG. 4, communications circuitry 32 of computing system 30 which is implemented as one of user interaction devices 10 is shown according to one possible embodiment. In one embodiment, communications circuitry 32 is configured to implement wired and/or wireless communications. In the illustrated configuration, communications circuitry 32 includes network communications circuitry 50, GPS communications circuitry 52, and local communications circuitry 54. Other configurations of communications circuitry 32 are possible including more, less and/or alternative components. For example, a communications interface (e.g., USB port, NIC interface) for implementing wired communications may also be provided.

In one embodiment, network communications circuitry 50 is configured to implement wireless communications with respect to network 24. In one more specific embodiment, network communications circuitry 50 is configured to communicate with cell towers of network 24 which includes a wireless cellular network. Accordingly, network communications circuitry 50 may implement wireless communications over relatively large distances (e.g., miles) in at least one embodiment.

GPS communications circuitry 52 is configured to implement wireless communications with external GPS transmitters (e.g., satellites). In one embodiment, GPS communications circuitry 52 may also include appropriate circuitry to provide Assisted GPS (AGPS) or Wireless Assisted GPS (WAGPS) which utilizes additional location information to provide location information of increased accuracy compared with use of GPS alone. GPS communications circuitry 52 may provide location information of computing system 30 directly in one embodiment or processing circuitry 34 may be configured to process signals received by GPS communications circuitry 52 to provide the location information of the computing system 30 in another embodiment.

Local communications circuitry 54 is configured to implement wireless communications with respect to local wireless communications devices (e.g., other user interaction devices 10, Wi-Fi communications devices) which are proximately located to the computing system 30. In one embodiment, local communications circuitry 54 is configured to implement Bluetooth, ad hoc or other suitable wireless communications with respect to the local wireless communications devices.

Referring to FIG. 5, one example embodiment of a user interface 38 of a user interaction device 10 is shown. The example user interface 38 includes an input device 60, display system 62, speaker 64 and microphone 66. Other arrangements of user interface 38 are possible including more, less and/or additional components.

Input device 60 is arranged to receive inputs of a user interacting with computing system 30. Input device 60 may include a graphical user interface, keyboard, pointing device (e.g., mouse) or other suitable apparatus to permit a user to input information and interact with the computing system 30.

Display system 62 is configured to generate visual images which may be viewed by the user. Display system 62 may depict images captured by camera 40, display digital content (e.g., windows, email, etc.) and display augmented reality representations in some examples.

Speaker 64 is configured to emit sound waves in one embodiment. The sound waves may include voice information, audio information and other sound waves which are discussed further below.

Microphone 66 is a configured to receive sound waves in one embodiment. Received sound waves may include voices and sound waves emitted by other computing systems 30 in some illustrative examples.

As discussed previously, user interaction devices 10 are configured to implement operations to enable users of the devices 10 to experience augmented reality. In one embodiment, the user interaction devices 10 may participate in augmented reality sessions which include a plurality of the devices 10. In another embodiment, a single user interaction device 10 may implement operations for its user to experience augmented reality without the presence of other user interaction devices 10 (e.g., associating augmented reality representations with physical objects present in the physical world). In some embodiments, the user interaction devices 10 may access management device 22 which may implement, manage and/or co-ordinate augmented reality operations for a single user interaction device 10 or a plurality of user interaction devices 10 (which may be participating in an augmented reality collaborative session with one another).

Accurate location information regarding locations of one or more user interaction device 10 is desired to improve the experience of augmented reality by the users. For example, the location information may be used by the user interaction device 10 to correctly and accurately associate augmented reality representations with respect to physical objects of the physical world. The augmented reality representations may be correctly associated with physical objects of the physical world when sufficiently accurate location information regarding the locations of the user interaction devices 10 and physical objects are used to implement augmented reality operations. Less accurate information regarding the locations of user interaction devices 10 may result in less than desirable augmented reality experiences. For example, an augmented reality symbol, such as a puppy, which is to be associated with a respective user and user interaction device 10 may be associated with improper user interaction devices, improper physical world objects, or otherwise not correctly depicted as being associated with the appropriate user interaction device 10.

Furthermore, in some embodiments, the physical objects which augmented reality representations are to be associated with may be portable (e.g., user interaction devices 10) whose locations may be constantly changing while augmented reality operations are being implemented. The locations of the portable physical objects are determined in sufficient real time to enable the augmented reality representations to be appropriate associated with the portable physical objects (i.e., enable the augmented reality representations to be depicted near or upon the appropriate physical objects in real time). Additionally, portable physical objects may move indoors and it is also desirable to enable augmented reality operations to be implemented indoors or at other locations where location information of the portable physical objects obtained via conventional sources (e.g., GPS) may not be sufficiently accurate.

In one embodiment, media system 20 including user interaction devices 10 and management device 22 may be arranged to implement location determination operations to provide sufficiently accurate location information regarding the user interaction devices 10 and other physical objects of the physical world to provide satisfactory experiences of augmented reality to users of the user interaction devices 10. A plurality of different methods for providing location information of the physical objects may be available for use. In some arrangements, the location results of the different methods may be combined to further improve the accuracy of the location information. In other arrangements, less than all of the methods may be available for use, but the available methods may provide improved results of increased accuracy of the locations of the user interaction devices 10 or other physical objects compared with reliance upon conventional methodologies (e.g., GPS).

Referring to FIG. 6, one example process of determining and using location information of one or more user interaction devices 10 is shown. In one embodiment, the method may be implemented by processing circuitry of a user interaction device which has been authorized to participate in augmented reality operations of the media system. Additional methods are possible including more, less and/or alternative acts.

At an act A10, a user interaction device may determine initial location information regarding its present location at an initial moment in time, for example when the user interaction device accesses the media system to implement augmented reality operations. In one example, the user interaction device may use location determination circuitry to provide the location information using aGPS. The initial location information determined by the user interaction device may have unacceptable error to implement accurate augmented reality operations with respect to the physical world depending upon the location of the user interaction device (e.g., indoors or otherwise located where reception of GPS communications may be relatively poor). Other techniques may also be utilized, for example, monitoring movements of the user interaction device from a last known position, for example, using output of movement/orientation circuitry 42.

At an act A12, the user interaction device may communicate the initial location information to the management device of the media system. In one embodiment, the initial location information may be aGPS data with an associated error reading. The user interaction device may also include a timestamp corresponding to the time when the location information was obtained and identification information which uniquely identifies the user interaction device.

The management device of the media system may utilize the initial location information to perform operations to attempt to determine refined location information which has increased accuracy with respect to the actual location of the user interaction device in the physical world compared with the initial location information. As discussed below, the management device may manage communications of the user interaction device with respect to other wireless communications devices (e.g., other user interaction devices and Wi-Fi communications devices) to provide refined location information according to one method and/or implement image recognition operations to provide the refined location information according to another method in illustrative example embodiments.

At an act A14, the user interaction device monitors for the reception of a communication from the management device. The communication indicates whether a sufficient number of wireless communications devices are proximately located to the user interaction device to implement operations with respect to the devices to attempt to provide the refined location information or the communication indicates that an insufficient number of wireless communications devices are present to implement the operations. In one embodiment, a threshold distance (e.g., corresponding to a local wireless communications range of the user interaction device which provided the initial location information in one example) may be used to determine whether other wireless communications devices are located sufficiently close to the communicating user interaction device. In one embodiment, the management device may maintain a database of locations of the wireless communications devices and the management device may use the initial location information to search the database to identify the presence of other wireless communications devices which may be proximately located to the user interaction device to implement wireless communications with the user interaction device.

If the result of act A14 is negative, the user interaction device may enter a device waiting state or mode as a waiter as described further below. In addition, the method may proceed to an act A20 to implement additional operations with respect to image recognition as discussed in detail below.

If the result of act A14 is affirmative, the process proceeds to an act A16 where the user interaction device implements localized communications with respect to the other proximately located wireless communications devices which were identified to be sufficiently close to the user interaction device for wireless communications. According to one example embodiment, the user interaction device may be controlled to be in different operational states as a transmitter and receiver of wireless communications signals at different moments in time to implement the wireless communications. Additional details of these communications and different operational states of the user interaction devices are discussed below with respect to the example embodiments of FIGS. 7-9.

At an act A18, information regarding the wireless communications between the proximately-located wireless communications devices may be communicated by the wireless communications devices participating in the communications to the management device. In one embodiment, the management device may process the information regarding the wireless communications in an attempt to provide refined location information for the wireless communications devices including the user interaction device which provided the initial location information at act A10. Additional details regarding the processing to determine the refined location information using the information regarding the wireless communications is described in further detail below with respect to one example embodiment of FIGS. 10*a*-10*c*.

In some embodiments where communications are implemented with respect to one or more Wi-Fi communications devices which are proximately located with respect to the user interaction device, the locations of the one or more Wi-Fi communications devices may be fixed and the known locations of these static communications devices may also be used to determine the location information of the user interaction device. The usage of the location information of these devices may provide increased accuracy compared to communications which do not utilize a static device since the location information of the static device may be known with a relatively high accuracy compared with locations of portable devices.

Following the communication of the information regarding the wireless communications, the user interaction device which provided the initial location information may proceed to implement operations with respect to images in an attempt to determine additional information regarding its location as described further below.

At an act A20, the user interaction device monitors for the reception of a communication from the management device indicating that one or more markers are proximately located to the user interaction device (e.g., within visible range of the optics of the camera user interaction device). For example, the management device may maintain a database of visual markers and their respective locations in the physical world and the management device may use the initial location information (as well as other location information resulting from the wireless communications) to search the database to identify markers which are located sufficiently close to the user interaction device to be captured by the camera of the user interaction device.

If the result of act A20 is negative, the process proceeds to an act A26 where the location information for the user interaction device may be updated, for example, using refined location information from the management device (e.g., based upon the wireless communications with other wireless communications devices). The refined location information may be stored as the location of the respective user interaction device in a database maintained by the management device and the refined location information may be communicated to one or more of the user interaction devices.

If the result of act A22 is affirmative, the process proceeds to an act A22 where the user interaction device which provided the initial location information captures images of the physical world about the user interaction device.

At an act A24, the images may be processed by the user interaction device in attempt to provide the refined location information. In one embodiment, the management device may communicate images of the markers (e.g., as well as information regarding locations in the physical world from which the images were captured) which are proximately located to the user interaction device to the user interaction device. The markers may be displayed to a user to inform the user of the presence and types of nearby markers.

The user interaction device may implement image processing techniques to analyze images captured by the user interaction device to identify whether the markers are present in the images. For example, object recognition processing may be used in one arrangement to identify the markers. Once the markers are identified, the images captured by the user interaction device may be processed with respect to the images of the markers received by the management device to identify location information regarding the locations of the user interaction device from which the images of the markers were captured by the user interaction device. This analysis may compare differences of the images and use the comparison with the known location information from which the images of the markers provided by the management device were captured. This determined location information may have increased accuracy of the location of the user interaction device compared with other available location information regarding the location of the user interaction device. Additional details regarding processing of images captured by the user interaction device are described below with respect to FIG. 11 in one embodiment.

In another embodiment, image data of images captured by the user interaction device may be communicated to the management device for processing to provide the determined location information. In some embodiments, the markers which are in the vicinity of the user interaction device may be communicated to the user interaction device to inform the user of available markers and thereafter the user may capture images of the markers and communicate the captured images to the management device for processing as described above in act A24. In other arrangements, the markers may not be communicated to the user interaction device and the user interaction device may upload captured images to the management device for processing to recognize the presence of any markers and determine the location information. Other methods are possible.

At an act A26, the refined location information determined by the wireless communications with other wireless communications devices and/or information obtained by image processing techniques may be used to update the location information of the user interaction device. The refined location information may have increased accuracy of the location of the user interaction device in the physical world compared with other available location information (e.g., GPS signals received by the user interaction device located in an indoors environment).

At an act A28, the user interaction device and/or management device may use the refined location information for various purposes. In one example, the user interaction device and/or management device may utilize the refined location information to implement augmented reality operations. In one more specific example, the user interaction device may utilize the refined location information to generate images which include augmented reality representations associated with physical world content. For example, the refined location information may be used to determine where the augmented reality representations will be depicted in the generated images of the physical world and to be viewed in real time by the user of the user interaction device in one embodiment. The management device may use the refined location information of a user interaction device 10 to identify markers or other user interaction devices which may be proximately located to the refined location information of the user interaction device 10.

As mentioned above, a user interaction device 10 may wirelessly communicate with other wireless communications devices which may be proximately located to the device 10 in attempts to determine refined location information regarding the actual location of the device 10 in the physical world with increased accuracy compared with other available location determination methods. An example implementation of using wireless communications to determine refined location information is described in additional detail with respect to FIGS. 7-9. The methods may be performed to determine refined location information using wireless communications between the wireless communications devices (e.g., user interaction devices, Wi-Fi communications devices) which are within wireless communications range of one another. More specifically, the method of FIG. 7 controls the states or modes of operation of the wireless communications devices as waiters, senders and receivers in one embodiment. The method of FIG. 8 discloses one method of operations with respect to one of the devices operating as a sender and the method of FIG. 9 discloses one method of operations with respect to one or more of the devices operating as receivers. The wireless communications devices may individually operate as a waiter, sender and receiver at different moments in time. At one moment in time, one of the wireless communications devices may operate as a sender to transmit a wireless communications signal and the other devices operate as receivers of the signal. At subsequent moments in time, the other wireless communications devices may individually operate as senders while the non-transmitting ones of the devices operate as receivers of the transmissions.

Referring to FIG. 7, a method of controlling the states or modes of operation of the wireless communications devices is described according to one embodiment. Other methods are possible including more, less and/or alternative acts. The method may be executed by processing circuitry of the management device in one implementation.

As mentioned above, the management device manages the wireless communications in one embodiment. In one illustrative example, a plurality of wireless communications devices may be within a wireless communications range of one another and the devices may implement wireless communications with respect to one another. The wireless communications may be used to determine refined location information of the devices with increased accuracy compared with the initial location information (e.g., GPS data) of the devices. The wireless communications devices may communicate initial location information and time information to the management device 22 and the management device 22 may use the location information and time information to search a database to identify the wireless communications devices which are within range of one another and capable of communicating with one another.

In one example communications arrangement discussed below, the management device determines the states or modes of operations wireless communications devices at different moments in time during the wireless communications. As discussed above in one example, the management device may instruct one of the wireless communications to operate as a sender of a wireless communications signal at one moment in time and instruct others of the wireless communications devices to operate as receivers to receive the wireless communications signal. At other moments in time, the management device may instruct others of the wireless communications devices to individually operate as the senders and the non-transmitting devices may be instructed to operate as receivers. After each of the wireless communications devices has operated as a sender, the results of the wireless communications may be analyzed to provide refined location information regarding the locations of the wireless communications devices in the physical world. When an insufficient number of wireless communications devices are present (or at other appropriate moments in time), the management device may instruct the wireless communications devices to operate as waiters where no wireless communications are implemented until a sufficient number of wireless communications (e.g., three) are within communications range of one another for the location determination operations to occur.

At an act A100, initial location information is accessed from a user interaction device. In one embodiment, the user interaction device communicates GPS location coordinates, accuracy information regarding the GPS data regarding the location of the user interaction device and a unique identifier to the management device. The user interaction device may also communicate accelerometer information (i.e., if the user interaction device is configured with an on-board accelerometer) which may be used to modify the initial location information by an offset according to movement detected by the accelerometer. A timestamp regarding the initial location information may also be recorded in one embodiment. The timestamp and initial location information for the user interaction device may be stored within a database of the management device as discussed below in one embodiment.

At an act A102, the processing circuitry accesses the database of the management device including information regarding wireless communications devices. The database may include respective location information for a plurality of user interaction devices which are interacting with the management device, and perhaps implementing augmented reality operations. Furthermore, the database may also maintain location information for a plurality of additional wireless communications devices, such as Wi-Fi communications devices.

At an act A104, it is determined whether the mapping is empty for the user interaction device which communicated the initial location information.

If the condition of act A104 is affirmative, a new mapping entry is created for the user interaction device and the received initial location information is stored as the location of the device at an act A106.

If the condition of act A104 is negative, the timestamp of the initial location information is compared with the last modification of the entry for the user interaction device at an act A108.

At an act A110, it is determined whether the length of time from the last entry to the new information exceeds a threshold.

If the condition of act A110 is affirmative, the mapped entry for the user interaction device is reset with the received initial location information at an act A112.

If the condition of act A110 is negative, the received initial location information may be disregarded and the stored location information for the user interaction device may be used.

At an act A114, it is determined whether any other wireless communications devices are proximately located to the location of the user interaction device. As mentioned above, the management device may maintain a database including location information for a plurality of wireless communication devices (e.g., user interaction devices, Wi-Fi communications devices). The management device may search the database to determine whether a sufficient number of wireless communications devices are within a threshold distance (e.g., wireless communications range) of the user interaction device. It is desired that at least three wireless communications devices be able to send and receive wireless communications with respect to one another in one embodiment. The accuracy of the location information determined from wireless communications of the devices increases as the number of communicating devices within communications range of one another increases. Furthermore, the accuracy of the information is increased if one or more of the wireless communications devices have a known static location in the physical world. If a sufficient number of devices were not located in act A114, the management device may output a control signal to instruct the user interaction device at an act A116 to become a waiter until a sufficient number of devices are proximately located to the user interaction device, for example, as determined by the management device.

If a sufficient number of devices were located in act A114, the management device determines whether the user interaction device has recently operated as a sender at an act A118. For example, the management device may determine whether the user interaction device has previously operated as a sender with the other wireless communications devices which are currently within the communications range of the user interaction device.

If the result of act A118 is affirmative, the management device proceeds to an act A122 to determine whether any of the other wireless communications devices which are proximately located to the user interaction device may become a sender.

If the result of act A118 or act A122 is negative, the management device outputs a control signal instructing the user interaction device which provided the initial location information to become a sender at an act A124. As discussed further below, the user interaction device may output a wireless communications signal which may be received by other wireless communications devices operating as receivers and the results of the communication may be used to provide refined location information regarding the location of the user interaction device in one embodiment.

If the result of act A122 is affirmative, the management device may output a control signal at an act A126 instructing the user interaction device to be a receiver which receives wireless communications signals from senders as discussed in detail below. In addition to outputting the control signals to the sender and receivers, the management device may also output a common timing reference to the senders and receivers which the senders and receivers may use to timestamp moments in time when the wireless communications signal is transmitted and received. For example, the timing reference may be the current time as determined by the management device and the senders and receivers may align their internal timing references to this time in one embodiment.

At an act A128, the management device may implement operations with respect to the user interaction devices. For example, the management device may communicate with the user interaction devices operating as senders and receiver in the example embodiments of FIGS. 8 and 9.

Referring to FIG. 8, an example method of operations implemented by a wireless communications device (e.g., user interaction device) operating as a sender is described. Other methods are possible including more, less and/or alternative acts.

As mentioned above, wireless communications between a plurality of wireless communications devices may be used to provide refined location information regarding the wireless communications devices. In one embodiment, one of the wireless communications devices operating as a sender emits a wireless communications signal which may be received by other wireless communications devices within a wireless communications range of the sender. The sender may output a plurality of different types of wireless communications signals in the described arrangement.

More specifically, in one example embodiment, the sender emits an electromagnetic wireless communications signal (e.g., Bluetooth, ad hoc wireless communications, or other signal). In another example embodiment, the sender emits a sound wave (e.g., a sound wave having a frequency which may be outside of the audible range of humans). The communicated signals may be received by the receivers and used to provide refined location information in one embodiment. In some embodiments, the wireless communications devices may communicate plural different types of signals (e.g., electromagnetic signals as well as sound waves).

At an act A150, a user interaction device which has been selected to be a sender communicates initial location information regarding its current location which is received by the management device.

At an act A152, the management device accesses the initial location information.

At an act A154, the management device creates a unique identifier for the user interaction device which acts as the sender. If sound waves are to be communicated, the management device may select (e.g., randomly in one embodiment) a unique frequency from a range of possible frequencies as the identifier which may be used. In other examples, the identifier may be an oscillation of sound frequencies or a Bluetooth server name which the device uses to transmit a Bluetooth signal.

At an act A156, the management device searches for other wireless communications devices which are proximately located to the user interaction device to act as receivers (if the receivers are not known) or the management device accesses a list of the proximately located devices which may act as receivers (if known).

At an act A158, the management device communicates the unique identifier of the sender to the receivers. The unique identifier may also include signal identification information which enables the receivers to identify the communications from the sender (e.g., identifies the sender of a Bluetooth communications signal, identifies the frequency of a sound wave from the sender, etc.).

At an act A160, the management device receives a plurality of responses from the receivers indicating that they have received the unique identifier and signal identification information and they are ready to receive the wireless communications signal to be emitted from the sender.

At an act A162, the management device communicates the unique identifier to the sender indicating that the receivers are ready and the management device may communicate a control signal to initiate wireless communications. The management device may also specify the frequency of a sound wave to be emitted if the devices are using sound waves.

At an act A164, the sender outputs the wireless communications signal (e.g., electromagnetic wave or sound wave) and records the time the signal is outputted. For electromagnetic signals, the sender may use appropriate communications circuitry to output the signal. For sound waves, a speaker of the sender may be used to output the signal.

At an act A166, the timestamp indicative of the time that the signal was outputted by the sender is communicated to the management device.

At an act A168, the management device accesses the timestamp regarding the outputting of the signal.

At an act A170, the management device accesses a plurality of communications from the receivers indicating the respective times the wireless communications signal which was outputted by the sender was received by the respective receivers. The wireless communications signal outputted by the sender may be received by the receivers at different times depending upon their distances from the sender.

At an act A172, the management device uses the information regarding the lengths of time between the outputting of the wireless communications signal and the reception of the signal by the plural receivers to determine linear distances between the sender and the receivers using the respective lengths of time of communications with respect to the receivers which may be multiplied by the velocity of the wireless signals which were communicated (e.g., sound, electromagnetic). The determined linear distances may be used to determine refined location information of the user interaction devices as discussed in one embodiment below with respect to FIGS. 10a-10c. The above-described process may be repeated a number of times between two devices and the resultant distances may be averaged in one embodiment.

The management device may also output a completion signal to the wireless communications devices indicating that it has obtained all information regarding the communication (i.e., transmission and reception) of the wireless communications signal. The completion signal may instruct the sender to cease sending the wireless communications signal.

At an act A174, the sender receives the completion signal from the management device and ceases outputting of the wireless communications signal.

At an act A176, the sender outputs a query to determine the next desired state of operation of the wireless communications device as a receiver or waiter.

At an act A178, the sender receives a response to the query from the management device in the form of a control signal to enter an operational state as a receiver or a waiter.

At an act A180, the sender changes its operational state to be a receiver for subsequent communications from other proximately located wireless communications devices or a waiter in accordance with the received response to the query.

Referring to FIG. 9, an example method of operations implemented by a wireless communications device (e.g., user interaction device) operating as a receiver is described. Other methods are possible including more, less and/or alternative acts.

At an act A200, the user interaction device receives a unique identifier from the management device which identifies wireless communications to be received from the sender. The unique identifier may identify the sender of Bluetooth signal or may identify a frequency of a sound wave and the sender of the sound wave.

At an act A202, the receiver prepares to receive the signal and communicates a ready signal to the management device.

At an act A204, the receiver waits for reception of the wireless communications signal to be communicated by the sender.

At an act A206, the receiver compares an amount of time waiting for the signal with a time interval to determine whether the time interval has passed. The user interaction device continues to wait for reception of the wireless communications signal if the time interval has not passed.

If the result of act A206 is affirmative, the receiver proceeds to an act A208 to output a notification to the management device that the device failed to receive the wireless communications signal.

At an act A210, the receiver queries the management device of whether to operate as a receiver, sender or waiter.

During the waiting for reception of the wireless communications signal, the receiver continually monitors for reception of the signal. If the wireless communications signal is detected at an act A212, the receiver proceeds to an act A214 to timestamp the time when the wireless communications signal was received. The receiver returns to act A204 to wait for the signal if the result of act A212 is negative.

At an act A216, the receiver communicates the timestamp of the reception of the wireless communications signal to the management device. The receiver may also include its respective identifier which allows the management device to identify the receiver which received the signal.

At an act A218, the receiver receives instructions from the management device which instructs the device to operate as a receiver, sender or waiter during subsequent communications of additional wireless communications signals.

At an act A220, the receiver enters the specified state of operation as a receiver, sender or waiter.

As mentioned above, the communicated wireless communications signals used to determine refined location information may include different types of signals (e.g., electromagnetic waves, sound waves). The above-recited methods of FIGS. 8 and 9 with respect to transmission and reception of signals may be implemented for the different types of signals. More specifically, the methods of FIGS. 8 and 9 may be performed to implement communications of electromagnetic signals at one moment in time and the methods may again be performed at another moment in time for communications of sound waves.

In one implementation, some of the wireless communications may be implemented automatically without control of a user while others of the wireless communications may be implemented as a result of user control. In one more specific example, the user interaction devices may be configured to initiate and implement Bluetooth communications automatically without user control while sound wave communications may be initiated as a result of user control or instruction. The use of sound waves may provide refined location information of improved accuracy in some embodiments compared with communications of electromagnetic waves since sound waves travel slower than electromagnetic waves.

The duration of the times of sound wave communications between the sending wireless communications device and the receiving wireless communications devices may be multiplied by the velocity of sound (e.g., 340.29 m/s) to determine the distances of the respective receiving wireless communications devices with respect to the sending wireless communications device. The speed of light may be used in calculations for the wireless communications of electromagnetic waves to determine the distances of the receivers with respect to the sender. The determined distances may be used as discussed below to provide refined location information.

As mentioned above, some of the wireless communications devices may be Wi-Fi communications devices which are arranged to wirelessly communicate with other wireless communications devices including the user interaction devices. Typical Wi-Fi communications devices are not portable but are rather implemented in fixed static locations (e.g., hot spots). In one embodiment, the management device may store the locations of Wi-Fi communications devices and may search for the presence of these devices which may be within a wireless communications range of one of more user interaction device which is implementing operations with respect to augmented reality described herein.

The use of Wi-Fi communications devices which are in static locations is advantageous since accurate information regarding these devices may be stored in the management device and used to accurately locate other wireless communications devices (e.g., user interaction devices). More specifically, since the location information of these devices may include reduced error compared with available location information of portable devices, the location information of the static devices may be used to provide refined location information which may have increased accuracy with respect to the portable devices compared with operations implemented solely between portable devices to provide the refined location information.

In one embodiment, portable user interaction devices may calculate their respective distances to static wireless communications devices which may result in reduced error in the determined locations of the portable user interaction devices since the error of the locations of the static wireless communications device in the physical world may be less compared with error present in available location information of the portable communications devices which would otherwise be used. For example, the location of one static device may be known with an increased degree of accuracy and accordingly the processing of information regarding communications with this device may provide location information with an increased degree of accuracy compared with processing of communications with devices which may all be dynamically moving.

In one embodiment, the database of the management device may be populated with identification and location information regarding a plurality of Wi-Fi communications devices. In one embodiment, users of an augmented reality community may upload location information to the management device of the Wi-Fi communications devices. For example, Wi-Fi communications devices may be programmed with their static locations upon installation in a facility and the information regarding the static locations may be provided to the management device. In another example, user interaction devices having accurate information regarding their present location may be positioned adjacent to the Wi-Fi communications devices and the location of the user interaction device may be uploaded with the identification information of the Wi-Fi communications devices to the management device. Any suitable arrangement may be used to provide the location information regarding the Wi-Fi communications devices to the management device and which may be stored therein for use in subsequent searching operations.

These Wi-Fi communications devices populated in the database of the management device may be subsequently searched at a later moment in time using initial location information of another user interaction device. The identified Wi-Fi communications devices which are proximately located to one or more user interaction device may be used to implement communications with respect to the user interaction devices as discussed above to provide refined location information of the user interaction devices and which may have increased accuracy compared with location information obtained by other methods, such as GPS.

In the example embodiment discussed above, the management device determines the refined location information using information regarding the wireless communications which are implemented between the wireless communications devices. In another embodiment, the receiving wireless communications devices (e.g., user interaction devices, Wi-Fi communications devices) may communicate information regarding moments in time when the wireless communications devices received a wireless communications signal which was emitted by a sender to the sender. The sender may use the received information to determine its refined location information using techniques described in further detail below (as opposed to having management device perform the calculations to determine the refined location information).

As mentioned above, wireless communications signals including sound waves may be utilized in attempts to improve the accuracy of the refined location information of a plurality of wireless communications devices. The following is a discussion of processing of sound waves received by a wireless communications device to identify wireless communications signals which were emitted by the sending wireless communications device according to one embodiment. As mentioned above, the receivers may receive a predefined frequency (i.e., the frequency is defined before the communication of the signal) from the management device and the receivers may process received sound waves in attempts to determine whether the predefined frequency is present in the received sounds waves.

The described processing may be performed upon output of a microphone of a receiving user interaction device in one embodiment. The received sound may be converted into a function which can be tested to determine if the specified frequency of the communicated wireless communications signal is present in the received domain. Received sound is a sinusoidal wave and a Fourier Transform of Eqn. 1 may be used to convert the received sound into a desired domain in one embodiment:

$$\hat{f}(\phi) = \int_{-\infty}^{\infty} f(x) e^{-2\pi i x \phi} dx \qquad \text{EQN. 1}$$

Essentially f(x) is the received sound at time x and $\hat{f}(\phi)$ is the Fourier Transform for which $\phi$ is the frequency in hertz being checked against. If a strong frequency $\hat{\phi}$ exists within the ambient noise, then $\hat{f}(\hat{\phi})$ will present a discernable maxima within the graphed $\hat{f}(\phi)$.

$\hat{f}(\phi)$ uses a complex integration to determine the entire domain. A Riemann's Sum may be used to estimate this value as closely to $\hat{f}(\phi)$ as possible. This is known as a Discrete Fourier Transform where samples will be taken from the noise in the room at a given interval. These samples may be reduced to:

$$-X_k = \sum_{n=0}^{N-1} x_n e^{-\frac{2\pi i}{N} kn} \quad k = 0, \ldots, N-1 \qquad \text{EQN. 2}$$

$x_n$ is a sequence of complex numbers that go from n=0, ..., n=N−1; i is the imaginary unit $\sqrt{-1}$, and k is the frequency to being checked against. For sound recognition, $x_n$ would represent the amplitude of the ambient sound at a sample (time) n, and $X_k$ represents the magnitude at frequency k.

In one example, received sound may be sampled at a rate of approximately 44100 samples per second. The samples may be partitioned into different groups and the processing of Eqn. 2 may be performed on the groups separately. A resolution may be computed by dividing the sampling rate of 44100 samples per second by the number of samples obtained (e.g., a number of obtained samples of 32768 provides a resolution of 1.34). The quotient of the frequency of the wireless communications signal may be divided by the resolution to provide the value of the result of the discrete Fourier Transform if the sound wave is present in the sound received by the wireless communications device.

In one embodiment, a threshold for the magnitude of frequency may be specified and the output of the processing for the frequency of interest may be compared with this threshold. As an example, if the frequency of interest with the ambience is 20 Hz then Eqn. 2 becomes $$X_{20_{hz}} = \sum_{n=0}^{N-1} x_n e^{-\frac{2\pi i}{N} 20_{hz} n}$$

and $X_{20_{hz}}$ is compared with the threshold. If the threshold is met, then it can be assumed that the sound frequency of interest is being communicated within the environment of the user interaction device. In one embodiment, the operations of determining location using sound waves may be implemented at times specified by the user for example when the presence of interfering sounds is low.

Once it is determined that the specified frequency of the wireless communications signal has been received, further operations may be performed in one embodiment to refine the processing of the time of reception of the signal by the receiver. The group of samples in which the appropriate sound wave was detected may be split into halves and the transform may be implemented on each half. The output of the Discrete Fourier Transform of the predefined frequency of the sound wave being analyzed should be smaller on the first half (if the frequency was present during the first and second halves) or only present in the second half (if the frequency was only present in the second half and not the first half). The half indicating where the frequency was received may be split into additional halves which may also be similarly processed until the amount of error of the time when the frequency was received is sufficiently small.

Figure 10A:
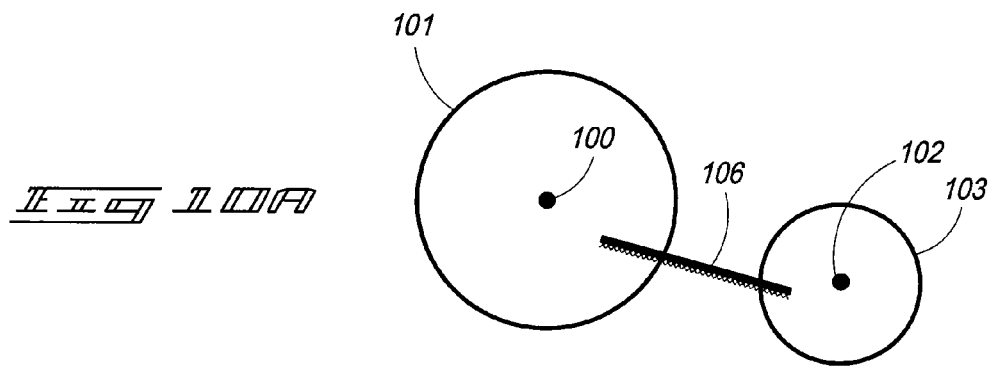
FIGS. 10a-10c are illustrative representations of a method of determining refined location information of a user interactive device according to one embodiment.
Figure 10B:
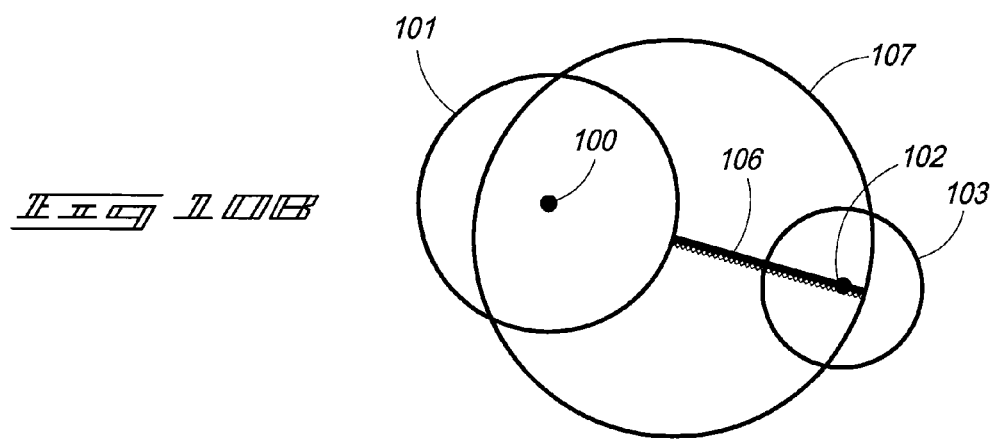
Figure 10C:
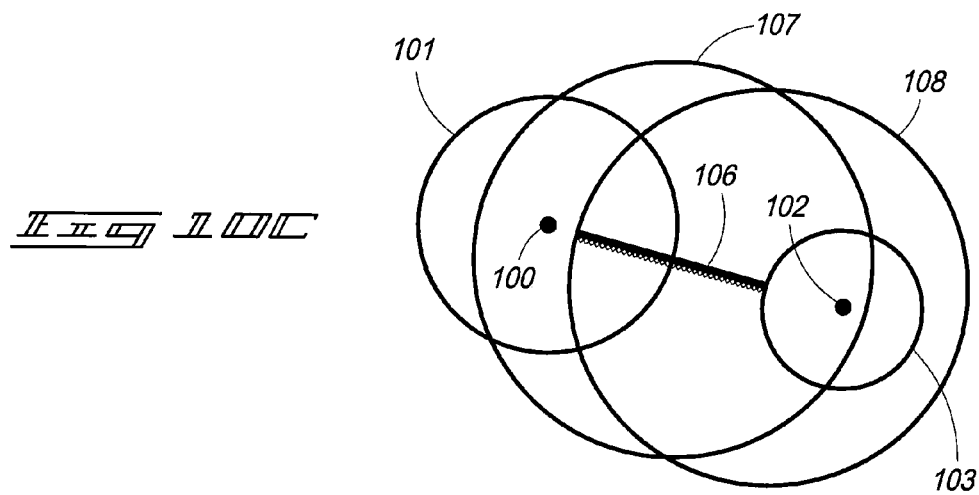

Referring to FIGS. 10a-10c, an example embodiment of a method for increasing the accuracy of a user is shown. In one embodiment, a user interaction device is configured to receive a GPS signal which provides the device's Cartesian coordinates as well as an accuracy radius which defines an accuracy circle about the coordinates where the user interaction device may exist. The example method described below reduces the size of the accuracy circle (e.g., the area of possible locations the user interaction device may be with respect to the provided coordinates) to provide refined location information regarding the location of the user interaction device with increased accuracy.

Referring to FIG. 10a, a plurality of user interaction devices 100, 102 are shown at different locations having respective coordinates as well as respective accuracy circles 101, 103 based upon GPS signals received by the user interaction devices 100, 102. In addition, a line 106 is illustrated which corresponds to a linear distance between the user interaction devices 100, 102 which was determined from processing of wireless communications between user interaction devices 100, 102 as described above. In one embodiment, the endpoints of the line 106 are processed with respect to the accuracy circles 101, 103 to reduce the areas of the accuracy circles 101, 103 where the user interaction devices 100, 102 may be located and to provide the refined location information regarding the locations of devices 100, 102 of increased accuracy compared with accuracy circles 101, 103.

In the described example, the user interaction devices 100, 102 exist within their respective accuracy circles 101, 103 and the devices 100, 102 are spaced a distance of the line 106 apart from one another. In one embodiment, the method reduces the size of one of the accuracy circles 101, 103 using the line 106 and the other of the accuracy circles 101, 103.

Referring to FIG. 10b, one example is described where a circle 107 is generated having a radius equal to the length of line 106. The accuracy of circle 103 may be reduced by identifying the union or overlap of circle 107 with circle 103 for all possible locations of device 100 within circle 101.

More specifically, an end point of line 106 may be placed on the edge of circle 101 and the intersection or overlap of circles 103, 107 may be determined. Next, the intersections or overlap may be repeatedly determined for all locations of an end point of line 106 about the edge of circle 101. After the intersections have been determined for circles 103, 107 for all locations of the end point of line 106 on the edge of circle 101, a union of all the intersections may be determined which indicates all possible locations of device 102 within accuracy circle 103.

Referring to FIG. 10c, the above-method may be repeated to identify all possible locations of device 100 within circle 101 by using line 106 to create circle 108 and placing an endpoint of line 106 on different locations of the edge of circle 103 to identify all interactions of circles 101, 108 indicating all possible locations of device 100 within accuracy circle 101.

The above-described processing provides two new areas corresponding to the intersections or overlaps of circles 101, 107 and 103, 108 and which include all possible coordinate locations of respective devices 100, 102. These two new areas may thereafter be used as updated accuracy areas for the devices 100, 102 for subsequent processing and which replace the initial accuracy circles 101, 103. These areas include smaller numbers of possible locations of the user interaction devices 100, 102 compared with the numbers of the possible locations of the devices 100, 102 within accuracy circles 101, 103 providing refined location information regarding the devices 100, 102.

In one embodiment, ellipsoids may be fitted to the new accuracy areas and the midpoints of the respective ellipsoids may be determined and used to indicate the new coordinates of the user interaction devices 100, 102. The updated accuracy areas are smaller than the areas of the initial accuracy circles 101, 103 providing refined location information which may be used in combination with the newly determined respective coordinates of the user interaction devices 100, 102 from the midpoints of the ellipsoids. The original accuracy circles and coordinates of the devices 100, 102 from the GPS signals may be disregarded and the newly determined accuracy areas and coordinate locations of the devices 100, 102 may be stored within the management device and used for subsequent operations, such as determining further refined location information using other user interaction devices, implementing augmented reality operations, or other uses. Other embodiments and methods are possible for reducing the accuracy circles and providing new coordinates of the devices 100, 102 in other embodiments.

The above-described example embodiment may also be implemented in arrangements where more than two user interaction devices are present. In one example method where three user interaction devices are present, the above-described processing may initially be implemented with respect to two of the devices to refine their accuracy circles/areas and determine new coordinates. After the processing with respect to the devices, the above-described processing may be implemented with respect to one of the two devices (e.g., device 100) and an additional third device (not shown in FIGS. 10a-10c). This processing was use the refined accuracy area and new coordinates of device 100 with the accuracy area (e.g., circle) of the third device and a linear distance between the device 100 and the third device which may be determined by processing wireless communications between device 100 and the third device. The new accuracy area and coordinates for device 100 and the third device may be stored and thereafter used for subsequent processing operations with respect to other devices.

The determined refined location information may be communicated to the user interaction devices for use by the devices to accurately associate augmented reality representations with respect to appropriate locations of the physical world. As mentioned above, the augmented reality representations may be associated with physical objects of the physical world. Additional details regarding usage of the refined location information is discussed below. The refined location information may also be stored in a database of the management device along with timestamp information which indicates a moment in time to which refined location information pertains.

The above-discussion is an example embodiment of utilization of wireless communications to implement operations with respect to determining refined location information which may have increased accuracy regarding the locations of a plurality of user interaction devices compared with other available location information. As mentioned above, other methods or techniques may also be utilized to also provide refined location information regarding the locations of the user interaction devices in the physical world. One method uses image recognition operations to provide refined location information as discussed below in one embodiment.

Referring to FIG. 11, one method is described which may be executed to calculate refined location information regarding one or more user interaction device using image recognition techniques according to one embodiment. Processing circuitry of the management device may be arranged to implement the operations of the described example method. In other arrangements, processing circuitry of the user interaction devices may be configured to implement one or more of the operations of the described method (e.g., processing of captured images to locate markers or to compare images of a marker as discussed below). Furthermore, other methods are possible including more, less and/or alternative acts.

At an act A300, the processing circuitry accesses initial location information regarding a location of a user interaction device. The initial location information may be obtained using aGPS circuitry of the user interaction device and which is communicated to the management device in one embodiment.

At an act A302, the processing circuitry may search a database of markers to locate one or more stored markers which may be viewable by the user interaction device using the initial location information. In other embodiments, initial location information of a user interaction device may be unavailable and the images captured by the user interaction device may be communicated to the management device and analyzed by the management device with respect to the stored images of the database. The use of initial location information improves the speed of the processing compared with some arrangements where initial location information is not available or is otherwise not used.

At an act A304, the identified markers may be communicated from the management device to the user interaction device. The user interaction device may display one or more images of the markers to inform the user of the possible presence of the markers in their environment and the user may capture images of the markers if the user find the markers in his environment.

At an act A306, the management device accesses images obtained from the user interaction device. In one example, the user of the user interaction device may use the identified markers to capture one or more images of the markers which are observable by the users. The images may be communicated to and accessed by the management device in act A306. As mentioned above, in another embodiment, the user may capture a plurality of images of their environment without knowledge of existing markers and the management device may process the images in attempts to locate the presence of the markers.

At an act A308, the processing circuitry performs image recognition operations to locate markers in the received images. In one embodiment, a database of known markers may be accessed and the processing circuitry may search images captured by the user interaction device for the presence of one or more of the known markers. The processing circuitry may utilize location information regarding the user interaction device to identify known markers which are proximately located to the user interaction device. The known markers may include images of physical objects in the physical world or symbols (e.g., geometric shapes such as a black outline of a bow tie on a white background). The images or symbols may be pre-processed before use as markers and the pre-processed images and symbols may be stored in the database for subsequent comparison operations in some embodiments.

In one preprocessing example, the markers are pre-processed through image recognition (computer vision). First, key features of the markers are determined using a multi-scale Hessian detector algorithm which is referenced in Herbert Bay, Andreas Ess, Tinne Tuytelaars, Luc Van Gool, called "Speeded-Up Robust Features (SURF)," Computer Vision and Image Understanding (CVIU), Vol. 110, No. 3, pp. 346-359, 2008, the teachings of which are incorporated herein by reference. This processing provides descriptors around keypoints which describe features of the markers for subsequent comparison operations to indicate whether a match is present. In one embodiment, the keypoints and descriptors may be stored within a database of the management device.

Thereafter, the images received from the user interaction device may also be processed using the multi-scale Hessian detector and SURF for determining features through keypoints and descriptors of the images. The keypoints and descriptors resulting from the processing of the images may be compared with the keypoints and descriptors of the known markers which are stored in the database to determine whether the images contain one or more of the known markers.

In one comparison embodiment, the keypoints and descriptors of the features of the images and the known markers are compared with one another to determine whether there is a sufficient match. A method for determining closely matched features is to compare the descriptors along with the edges of the keypoint to keypoint within the received images of a scene or marker. One example method is referred to as FLANN and is described in Marius Muja, and David Lowe, "Fast Approximate Nearest Neighbors with Automatic Algorithm Configuration," International Conference on Computer Vision Theory, 2009, the teachings of which are incorporated herein by reference. The comparison will locate known markers present in the received images including location, pose, and scale of the markers.

At an act A310, the processing circuitry may process images captured by the user interaction device and which include one or more markers with respect to stored images of the markers to provide refined location information regarding the location of the user interaction device in one embodiment. The management device may include a database of images of the markers. The database may also include location information which indicates various locations in the physical world from which the images of the markers in the database were captured from at previous moments in time. The images containing the markers captured by the user interaction device may be compared to the stored images of the markers which were captured from these known locations. The comparison of the images received from the user interaction device with the stored images and the usage of the known locations from which the stored images were captured provides refined location information regarding the locations of the user interaction device when the images of the markers were captured by the user interaction device. The refined location information may have increased accuracy regarding the locations of the user interaction device compared with the initial location information. In another example, a size of the marker of an image captured from a known location may be compared with a size of the marker in an image captured by the user interaction device and the results of the comparison may provide information regarding the location of the user interaction device.

In one embodiment using FLANN, the comparison of the images from the user interaction device with the stored images of the markers determines whether any of the images of the markers match. If one of the images from the user interaction device contains a marker which matches a marker in one of the stored images, then the refined location information of the user is set to the location from which the matching stored image was captured from.

In other examples, an image from the user interaction device may contain a stored marker which may be detected by FLANN as being a match even though the image from the user interaction device may have been captured from a different location than the image of the stored marker. The features of the stored marker may be modified using a perspective transform to match the features of the marker within the image from the user interaction device. The perspective transform modifies the features of the stored marker to appear as if the image was captured from different locations. Once the modifications by the perspective transform identify a match of the modified features of the stored marker with the features of the marker in the image from the user interaction device, the offset of the user's location from which the user captured the image is known with respect to the location from which the image of the stored marker was obtained and may be used to provide refined location information of the user interaction device. More specifically, in this example, the refined location information is set to the location from which the image of the stored marker was captured as modified by the offset which was determined by the perspective transform processing.

At an act A312, the images received from the user interaction devices and which include the markers (and the determined location information of the user interaction device when the images were captured) may be stored in the database and used for future image processing operations of subsequently captured images to provide location information of devices which captured the subsequent images.

In one embodiment, it is desired to have accurate information regarding the locations from which the images were captured and information regarding the accuracy of the location information may be used to determine whether images are stored in the database and used for subsequent image processing operations to provide location information of other users. Furthermore, accuracy resulting from the processing of images may be improved when a plurality of markers are present in the images for processing or a plurality of different images of a single marker which were obtained from different locations are available for processing. In some embodiments, a user may upload a plurality of images of a marker which may be slightly rotated from one another or observed from slightly different locations.

At an act A314, the refined location information may be communicated to one or more of the user interaction devices and used by the devices for implementing operations with respect to experiencing augmented reality or other uses. The refined location information may also be stored within the database which includes the wireless communications devices and their respective locations.

As mentioned above, other methods are possible and some of the acts may be performed by different entities or omitted. In another example, the markers may not be communicated to the user interaction device, but rather the user interaction device may capture images of its environment and the images may be uploaded to the management device for processing to locate markers and provide refined location information using the located markers by comparison with existing images in a database of the management device.

In another embodiment, images of markers from the database of the management device may be communicated to the user interaction devices and used by the devices to calculate refined location information. In one embodiment, the user interaction device may be configured to process images captured by the user interaction device including performing object recognition operations to identify the presence of markers and to compare the captured images with the images from the database to provide the refined location information as discussed above with respect to operations of the management device.

The management device may have greater processing capacity than the processing capacities of the user interaction devices and implementing processing of images using the management device may be faster than processing of the images using the user interaction devices.

The above discussion describes various methods for determining refined location information regarding locations of user interaction devices in the physical world. The refined location information may be used to accurately associate augmented reality representations at appropriate locations of the physical world as captured by the user interaction devices. For example, the refined location information of the plurality of user interaction devices may be used to associate augmented reality representations with physical objects of the physical world.

In one example, a plurality of markers may be associated with a plurality of respective virtual objects. Accordingly, when a marker is located in an image of a scene, the user interaction device may depict the virtual object in the image by replacing the marker 14 with the virtual object representation in images depicted using the display (e.g., the puppy representation 18 replaces the marker 14 shown in FIG. 1).

Improvements in processing capabilities and communications bandwidth have led to new implementations and applications of augmented reality systems. Provision of accurate location information utilizing apparatus and methods described herein according to example embodiments of the disclosure enable computing systems, including portable devices, to implement improved augmented reality operations. At least some aspects of the disclosure provide systems, apparatus and methods which enable locations of user interaction devices to be determined with increased accuracy permitting augmented reality representations to be referenced with respect to the physical world with increased accuracy compared with usage of location information determined by conventional methods such as GPS which has inherent limited accuracy and has yet larger error in some areas (e.g., indoors). Accurate location information of the augmented reality user interaction devices enables augmented reality representations to be correctly referenced with respect to the physical world such that different user interaction devices experiencing the augmented reality representations will portray the augmented reality representations correctly with respect to the physical world (i.e., at appropriate locations with respect to physical world locations and objects).

Some conventional location technologies including GPS have shortcomings with respect to use in augmented reality systems as discussed above. More specifically, civilian entities are currently precluded from obtaining the highest accuracy possible from GPS. In addition, the accuracy of GPS is further degraded at indoor locations or at other locations where the signals from the satellites of the GPS system may encounter obstacles or may not be clearly received. Cell tower triangulation has been used in conventional arrangements to augment GPS readings but this methodology also has shortcomings of being of limited use indoors or in areas which are lacking a sufficient number of cell towers.

At least some aspects of the disclosure include obtaining and combining location information from different techniques in attempts to accurately locate the positions of the user interaction devices. Location information obtained from aspects of the disclosure may be used separately or in combination with conventional location determination arrangements in some embodiments.

The protection sought is not to be limited to the disclosed embodiments, which are given by way of example only, but instead is to be limited only by the scope of the appended claims.

Further, aspects herein have been presented for guidance in construction and/or operation of illustrative embodiments of the disclosure. Applicant(s) hereof consider these described illustrative embodiments to also include, disclose and describe further inventive aspects in addition to those explicitly disclosed. For example, the additional inventive aspects may include less, more and/or alternative features than those described in the illustrative embodiments. In more specific examples, Applicants consider the disclosure to include, disclose and describe methods which include less, more and/or alternative steps than those methods explicitly disclosed as well as apparatus which includes less, more and/or alternative structure than the explicitly disclosed structure.

The invention claimed is:

1. A location determination method comprising:
    accessing first location information regarding a location of a user interaction device in a physical world, wherein the user interaction device is configured to generate an augmented reality representation with respect to the physical world;
    using the first location information, identifying a marker which is proximately located with respect to the location of the user interaction device;
    accessing an image generated by the user interaction device which includes the marker; and
    processing the image to determine second location information regarding the location of the user interaction device, and wherein the second location information has increased accuracy with respect to the location of the user interaction device in the physical world compared with the first location information.

2. The method of claim 1 wherein the processing comprises processing the image generated by the user interaction device with respect to an image of the marker.

3. The method of claim 2 wherein the processing comprises processing the image generated by the user interaction device using information regarding a known location from which the image of the marker was captured.

4. The method of claim 1 wherein the accessing the first location information and the identifying are implemented using a management device which is in wireless communication with the user interaction device.

5. The method of claim 4 further comprising storing an image of a marker received from the user interaction device in a database.

6. The method of claim 4 wherein the identifying comprises searching a database which includes the marker using the first location information.

7. The method of claim 4 further comprising communicating the marker from the management device to the user interaction device, and wherein the processing comprises processing using the user interaction device.

8. The method of claim 4 further comprising:
communicating the marker from the management device to the user interaction device; and
displaying the marker using the user interaction device.

9. The method of claim 4 wherein the accessing the image and the processing are implemented using the management device.

10. The method of claim 9 further comprising communicating the second location information to the user interaction device.

11. A computing system comprising:
communications circuitry configured to implement communications externally of the computing system; and
processing circuitry coupled with the communications circuitry, and wherein the processing circuitry is configured to access first location information received by the communications circuitry regarding a location of a user interaction device in a physical world, to identify a marker which is proximately located with respect to the location of the user interaction device, to access a plurality of images generated by the user interaction device, and to process the images with respect to the marker to determine second location information regarding the location of the user interaction device and which has increased accuracy with respect to the location of the user interaction device in the physical world compared with the first location information.

12. The system of claim 11 wherein the processing circuitry is configured to process the images generated by the user interaction device with respect to an image of the marker which was captured from a known location to determine the second location information.

13. The system of claim 12 wherein the processing circuitry is configured to process the images generated by the user interaction device using information regarding the known location from which the image of the marker was captured.

14. The system of claim 11 wherein the processing circuitry is configured to process the images generated by the user interaction device to locate the marker in at least one of the images.

15. The system of claim 11 further comprising storage circuitry comprising a database of markers, and wherein the processing circuitry is configured to search the database using the first location information to identify the marker.

16. The system of claim 11 wherein the marker comprising an initial marker, and further comprising storage circuitry comprising a database including the initial marker and a plurality of additional markers, and wherein the communications circuitry is configured to receive at least one of the additional markers from externally of the computing system.

17. The system of claim 11 wherein the processing circuitry is configured to control the communications circuitry to communicate the marker to the user interaction device.

18. The system of claim 11 further comprising storage circuitry configured to store augmented data comprising an augmented reality representation, and wherein the processing circuitry is configured to control the communications circuitry to communicate the augmented data to the user interaction device.

19. The system of claim 18 wherein the augmented reality representation comprises a virtual object.

20. An article of manufacture comprising:
non-transitory media comprising programming which causes processing circuitry to perform processing comprising:
accessing first location information regarding a location of a user interaction device in a physical world;
identifying a marker which is proximately located with respect to the location of the user interaction device;
accessing a plurality of images generated by the user interaction device; and
processing the images with respect to the marker to determine second location information regarding the location of the user interaction device and which has increased accuracy with respect to the location of the user interaction device in the physical world compared with the first location information.

* * * * *

UNITED STATES PATENT AND TRADEMARK OFFICE
CERTIFICATE OF CORRECTION

PATENT NO. : 8,493,206 B2  Page 1 of 1
APPLICATION NO. : 12/847771
DATED : July 23, 2013
INVENTOR(S) : Luke Richey and Allen Greaves It is certified that error appears in the above-identified patent and that said Letters Patent is hereby corrected as shown below:

In the Specification

Column 3, line 8 – Replace ", A location" with --, a location--

Column 4, line 12 – Replace "information" with --information.--

Column 4, line 55 – Replace "may depicted" with --may be depicted--

Column 6, line 16 – Replace "respect augmenting" with --respect to augmenting--

Column 6, line 53 – Replace "interaction devices" with --interaction device--

Column 8, line 18 – Remove "to the device 10"

Column 11, line 40 – Replace "is a configured" with --is configured--

Column 14, line 55 – Replace "act A22 is" with --act A20 is--

Column 14, line 65 – Remove "to the user interaction device"

Column 18, line 51 – Replace "and receiver" with --and receivers--

Column 21, line 57 – Replace "one of more" with --one or more--

Column 22, line 61 – Replace "to the sender" with --to the receiver--

Column 23, lines 46-47 – Replace "frequency to being" with --frequency being--

Column 25, line 59 – Replace "was use" with --may use--

Column 26, line 59 -- Replace "user find the" with --user finds the--

Signed and Sealed this
Twenty-second Day of October, 2013

Teresa Stanek Rea
*Deputy Director of the United States Patent and Trademark Office*